United States Patent
Zhou et al.

(10) Patent No.: US 11,855,738 B2
(45) Date of Patent: Dec. 26, 2023

(54) ANTENNA PANEL SELECTION FOR UPLINK TRANSMISSION UNDER A MAXIMUM PERMISSIBLE EXPOSURE (MPE) LIMIT

(71) Applicant: QUALCOMM Incorporated, San Diego, CA (US)

(72) Inventors: Shanyu Zhou, San Diego, CA (US); Arumugam Chendamarai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/344,844

(22) Filed: Jun. 10, 2021

(65) Prior Publication Data

US 2021/0391913 A1 Dec. 16, 2021

Related U.S. Application Data

(60) Provisional application No. 63/039,404, filed on Jun. 15, 2020.

(51) Int. Cl.
*H04B 7/08* (2006.01)
*H04W 52/14* (2009.01)

(52) U.S. Cl.
CPC ........ *H04B 7/0834* (2013.01); *H04W 52/146* (2013.01)

(58) Field of Classification Search
CPC .. H04B 7/0834; H04B 17/318; H04W 52/146
(Continued)

(56) References Cited

U.S. PATENT DOCUMENTS

| 2019/0200365 A1 | 6/2019 | Sampath et al. |
| 2020/0059283 A1 | 2/2020 | Venugopal et al. |

(Continued)

FOREIGN PATENT DOCUMENTS

| EP | 3648366 A2 | 5/2020 | |
| WO | WO-2020143761 A1 * | 7/2020 | ............ H04W 52/08 |

OTHER PUBLICATIONS

Intel Corporation: "Performance considerations for RF exposure compliance in FR2", 3GPP Draft, 3GPP TSG-RAN WG4 Meeting #86-Bis, R4-1804127, Performance considerations for RF exposure compliance in FR2, 3rd Generation Partnership Project (3GPP), Mobile Competence Centre, 650, Route Des Lucioles, F-06921 Sophia-An, vol. RAN WG4, No. Melbourne, Australia, Apr. 16, 2018-Apr. 20, 2018, Apr. 15, 2018 (Apr. 15, 2018), XP051431032, 4 Pages, Retrieved from the Internet: URL: http://www.3gpp.org/ftp/Meetings%5F3GPP%5FSYNC/RAN4/Docs/. [retrieved on Apr. 15, 2018] the whole document.

(Continued)

*Primary Examiner* — Leila Malek
(74) *Attorney, Agent, or Firm* — Loza & Loza LLP

(57) ABSTRACT

Aspects relate to beam management reports that enable selection of best antenna panel and beam combinations for uplink transmissions from a user equipment (UE) when one or more antenna panels of the UE are subject to a maximum permissible exposure (MPE) limit. The UE receives a reference signal at a plurality of antenna panels, wherein the reference signal is received in different beams on each of the plurality of antenna panels. The UE determines N beams providing highest measured strengths of the reference signal on at least one of the plurality of antenna panels, wherein the MPE limit is to be applied to the at least one of the plurality of antenna panels for uplink transmissions. The UE transmits a beam management report including reduced highest (Continued)

measured strengths of the reference signal in the N beams to account for the MPE limit.

12 Claims, 22 Drawing Sheets

(58) Field of Classification Search
USPC .......................................................... 375/267
See application file for complete search history.

(56) References Cited

U.S. PATENT DOCUMENTS

| | | | | |
|---|---|---|---|---|
| 2020/0067615 | A1* | 2/2020 | Ghanbarinejad | .... H04B 17/309 |
| 2020/0145080 | A1* | 5/2020 | Tang | ................. H04W 52/0235 |
| 2020/0314774 | A1* | 10/2020 | Heo | ...................... H04W 52/42 |
| 2022/0116891 | A1* | 4/2022 | Yao | .................... H04W 52/367 |

OTHER PUBLICATIONS

International Search Report and Written Opinion—PCT/US2021/037299—ISA/EPO—dated Sep. 13, 2021.

\* cited by examiner

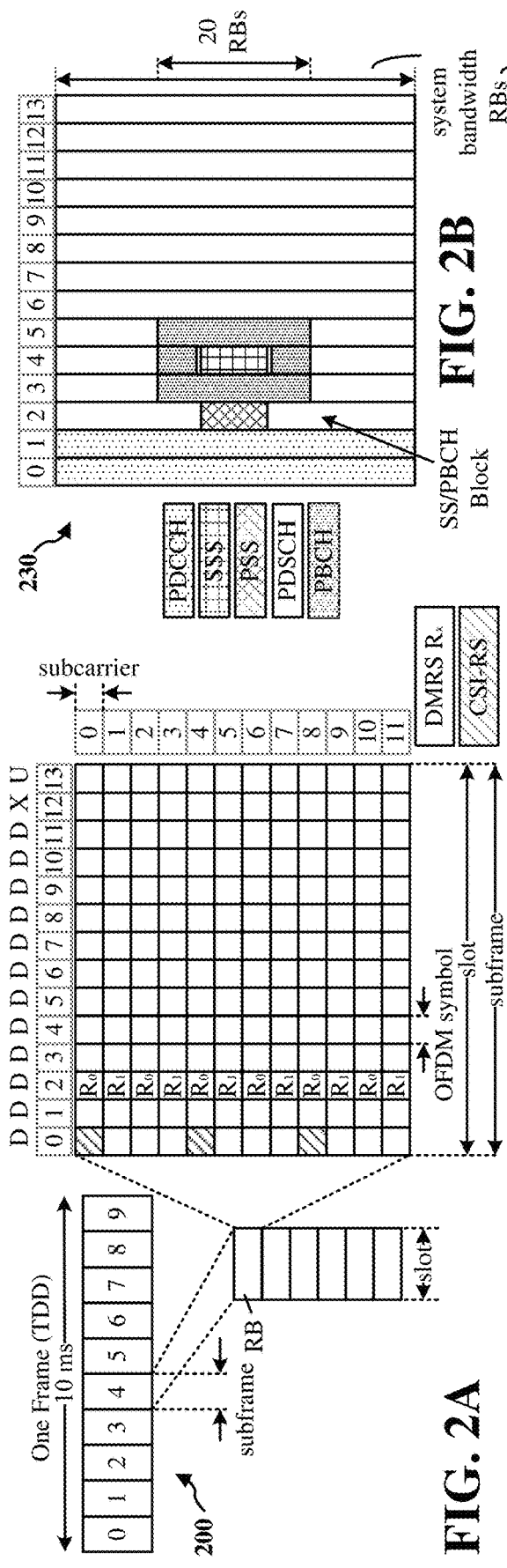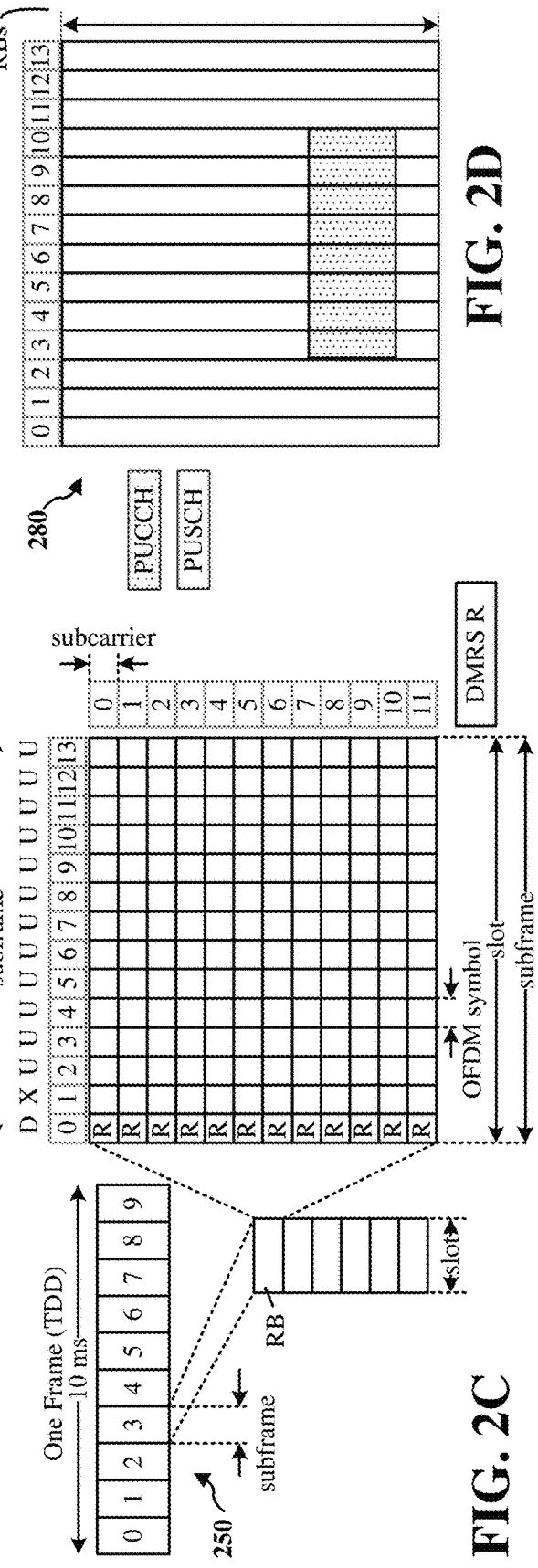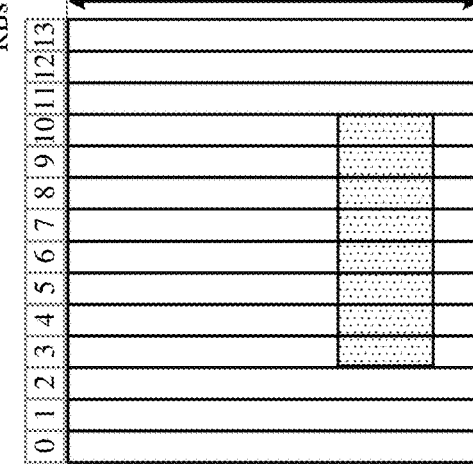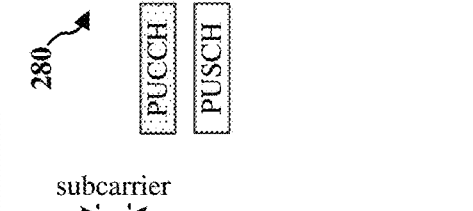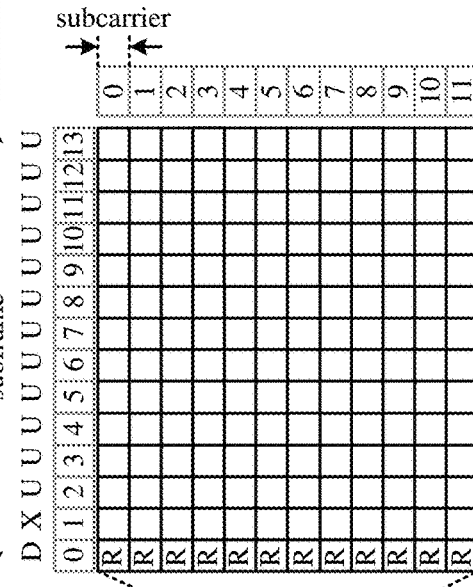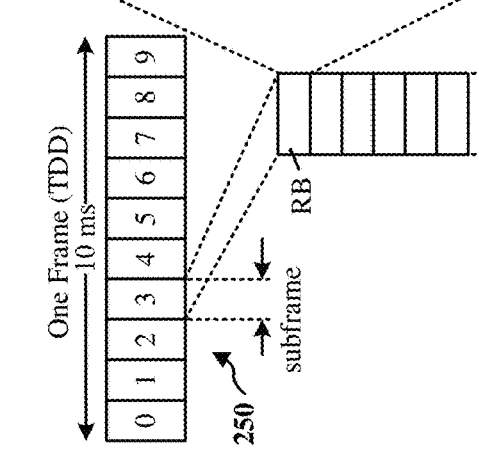

| | Highest measured strength of reference signal in beams of antenna panel (e.g., best beam) | Highest measured strength of reference signal after accounting for transmission power back-off (e.g., best beam after accounting for transmission power back-off) |
|---|---|---|
| 602 ⟩ Antenna panel_1 | P1 | P1 – backoff_1 |
| 604 ⟩ Antenna panel_2 | P2 | P2 – backoff_2 |

| | Highest measured strengths of reference signal in N beams on antenna panel | Transmission power back-off value |
|---|---|---|
| 602 Antenna panel_1 | P1 | backoff_1 |
| 604 Antenna panel_2 | P2 | backoff_2 |

| | Highest measured strengths of reference signal in N beams on antenna panel | MPE indicator |
|---|---|---|
| 602 Antenna panel_1 | P1 | 0 |
| 604 Antenna panel_2 | P2 | 1 |

ANTENNA PANEL SELECTION FOR UPLINK TRANSMISSION UNDER A MAXIMUM PERMISSIBLE EXPOSURE (MPE) LIMIT

CROSS REFERENCE TO RELATED APPLICATION(S)

This application claims the benefit of U.S. Provisional Application Ser. No. 63/039,404, entitled "ANTENNA PANEL SELECTION FOR UPLINK TRANSMISSION UNDER A MAXIMUM PERMISSIBLE EXPOSURE (MPE) LIMIT" and filed on Jun. 15, 2020, which is expressly incorporated by reference herein in its entirety.

BACKGROUND

Technical Field

The present disclosure relates generally to communication systems, and more particularly, to antenna panel selection for uplink (UL) transmission under a maximum permissible exposure (MPE) limit.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) and a base station in a wireless communication network may employ a set of procedures (e.g., beam management (BM) procedures) to maintain proper alignment of transmitter and receiver beams. The UE may be equipped with multiple antenna panels, where each of the multiple antenna panels may enable the UE to support multiple beams with respect to the base station. In one example, if a UE is equipped with a first antenna panel supporting a first set of beams and a second antenna panel supporting a second set of beams, the UE may measure the strength of beamformed reference signals received from the base station for each of the first set of beams at the first antenna panel and for each of the second set of beams at the second antenna panel.

In some examples, the UE may generate a beam management report including one or more measured strengths of beamformed reference signals received in the beams of the antenna panels at the UE. The base station may select an antenna panel and beam combination that currently provides the best performance based on the measured strengths included in the beam management report.

In some scenarios, however, the UE may be subject to transmission power regulations, such as a maximum permissible exposure (MPE) limit due to the presence of human contact proximate to an antenna panel of the UE. Therefore, some of the measured strengths of the beamformed reference signals included in the beam management report may not serve as an accurate indication of uplink performance for beams on antenna panels subject to the MPE limit. As a result, the base station may not be able to select the best beam and antenna panel combination for uplink transmissions when relying on the measured strengths of the beamformed reference signals in the beam management report.

Aspects relate to beam management reports that enable selection of best antenna panel and beam combinations for uplink transmissions from a user equipment (UE) when one or more antenna panels of the UE are subject to a maximum permissible exposure (MPE) limit.

In an aspect of the disclosure, a method, a computer-readable medium, and an apparatus are provided. For example, the apparatus may be a UE. The apparatus receives a reference signal at a plurality of antenna panels, wherein the reference signal is received in different beams on each of the plurality of antenna panels. The apparatus determines N beams providing highest measured strengths of the reference signal on at least one of the plurality of antenna panels, wherein an MPE limit is to be applied to the at least one of the plurality of antenna panels for uplink transmissions. The apparatus transmits a beam management report, wherein the beam management report includes reduced highest measured strengths of the reference signal of the N beams based on the MPE limit.

In an aspect of the disclosure, a method, a computer-readable medium, and an apparatus are provided. The apparatus receives a reference signal at a plurality of antenna panels, wherein the reference signal is received in different beams on each of the plurality of antenna panels. The apparatus determines, for each of the plurality of antenna panels, N beams providing highest measured strengths of the reference signal. The apparatus transmits a beam management report including at least the highest measured strengths of the N beams for each of the plurality of antenna panels and a transmission power back-off value for each of the plurality of antenna panels.

In an aspect of the disclosure, a method, a computer-readable medium, and an apparatus are provided. The apparatus receives a reference signal at a plurality of antenna panels, wherein the reference signal is received in different beams on each of the plurality of antenna panels. The apparatus determines, for each of the plurality of antenna panels, N beams providing highest measured strengths of the reference signal. The apparatus transmits a beam management report including at least the highest measured strengths of the N beams for each of the plurality of antenna panels and a value of an MPE indicator for each of the plurality of antenna panels.

In an aspect of the disclosure, a method, a computer-readable medium, and an apparatus are provided. The apparatus receives a reference signal at a plurality of antenna panels, where the reference signal is received in different beams on each of the plurality of antenna panels. The apparatus determines that an MPE limit is to be applied to at least one of the plurality of antenna panels for uplink transmissions. The apparatus determines N beams, from among a plurality of beams on the at least one of the plurality of antenna panels, providing highest measured strengths of the reference signal. The apparatus generates a beam management report including at least the highest measured strengths of the N beams after accounting for the MPE limit. The apparatus transmits the beam management report.

In an aspect of the disclosure, a method, a computer-readable medium, and an apparatus are provided. The apparatus receives a reference signal at a plurality of antenna panels, wherein the reference signal is received in different beams on each of the plurality of antenna panels. The apparatus determines, for each of the plurality of antenna panels, N beams providing highest measured strengths of the reference signal. The apparatus determines a transmission power back-off value for each of the plurality of antenna panels. The apparatus generates a beam management report including at least the highest measured strengths of the N beams for each of the plurality of antenna panels and the transmission power back-off value for each of the plurality of antenna panels. The apparatus transmits the beam management report.

In an aspect of the disclosure, a method, a computer-readable medium, and an apparatus are provided. The apparatus receives a reference signal at a plurality of antenna panels, where the reference signal is received in different beams on each of the plurality of antenna panels. The apparatus determines, for each of the plurality of antenna panels, N beams providing highest measured strengths of the reference signal. The apparatus determines a value of an MPE indicator for each of the plurality of antenna panels, where the MPE indicator indicates whether an antenna panel is preferred or nonpreferred for uplink transmissions. The apparatus generates a beam management report including at least the highest measured strengths of the N beams for each of the plurality of antenna panels and the value of the MPE indicator for each of the plurality of antenna panels. The apparatus transmits the beam management report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 7 includes a diagram illustrating an example beam management scenario for a UE having multiple antenna panels.

FIG. 11 is an example beam management report in accordance with various aspects of the disclosure.

FIG. 13 is an example beam management report in accordance with various aspects of the disclosure.

DETAILED DESCRIPTION

Figure 1:
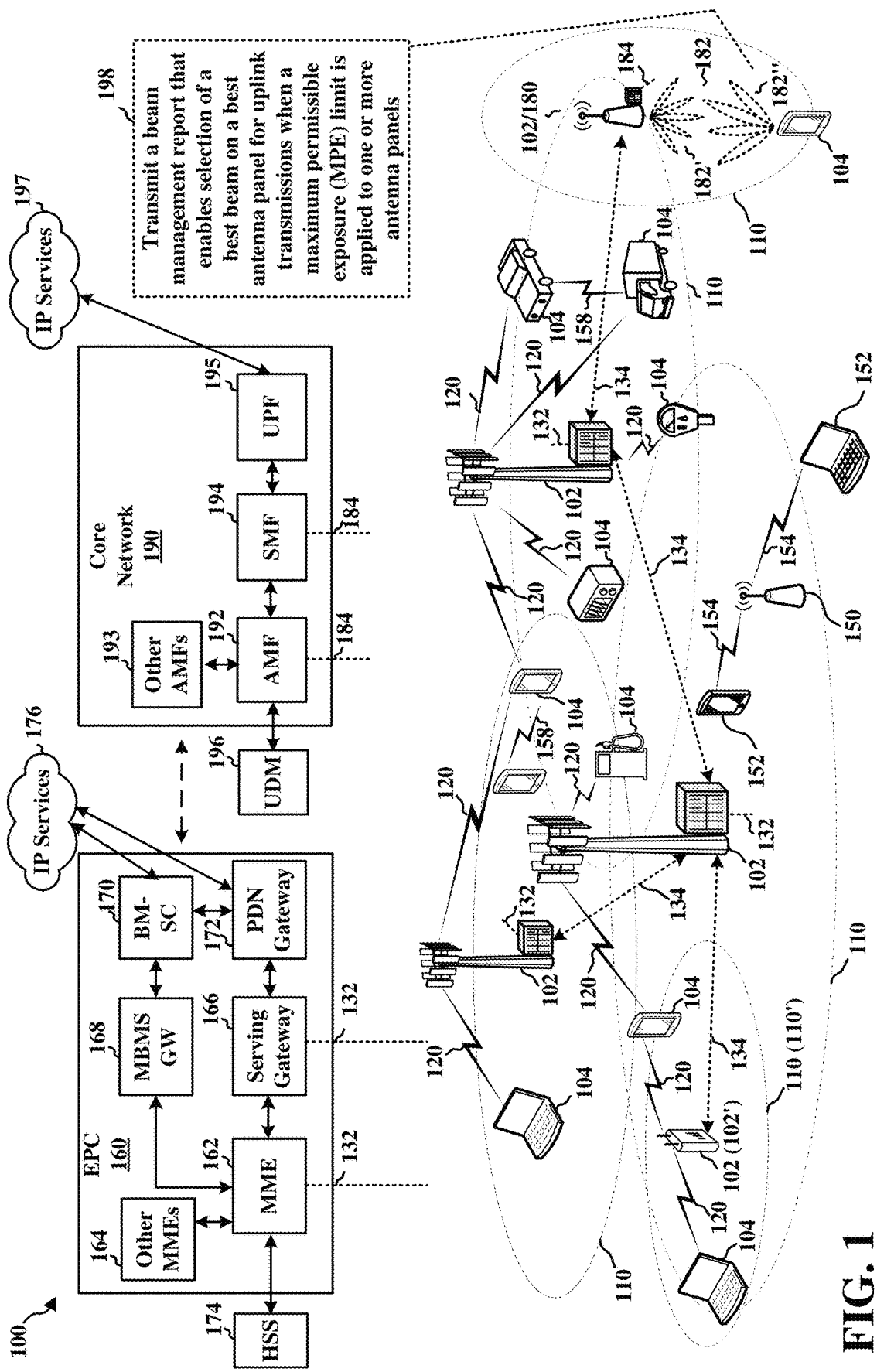
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit a beam management report that enables selection of a best beam on a best antenna panel for uplink transmissions when a maximum permissible exposure (MPE) limit is applied to one or more antenna panels 198. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
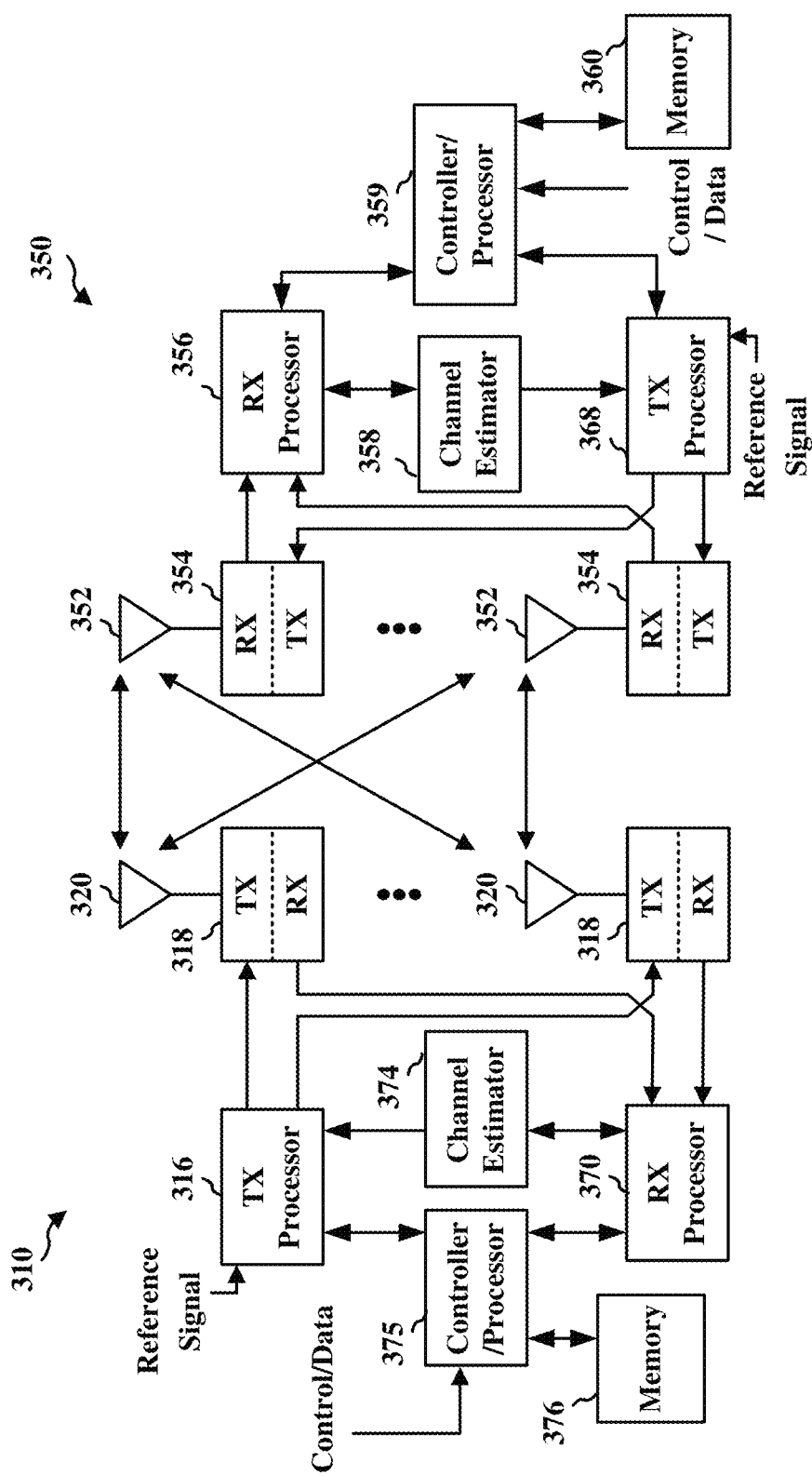
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

As described herein, a wireless communication network (e.g., a 5G NR network) may provide mechanisms by which a UE and a base station (e.g., a mmW base station) can establish directional transmission links using beamformed signals. Such directional links, however, may need fine alignment of a transmitter beam and a receiver beam to achieve acceptable communication quality. Therefore, the UE and base station may employ a set of procedures herein referred to as beam management (BM) to maintain proper alignment of transmitter and receiver beams. In some examples, beam management may be performed during one or more beam management sessions as described with reference to FIG. 4.

Figure 4:
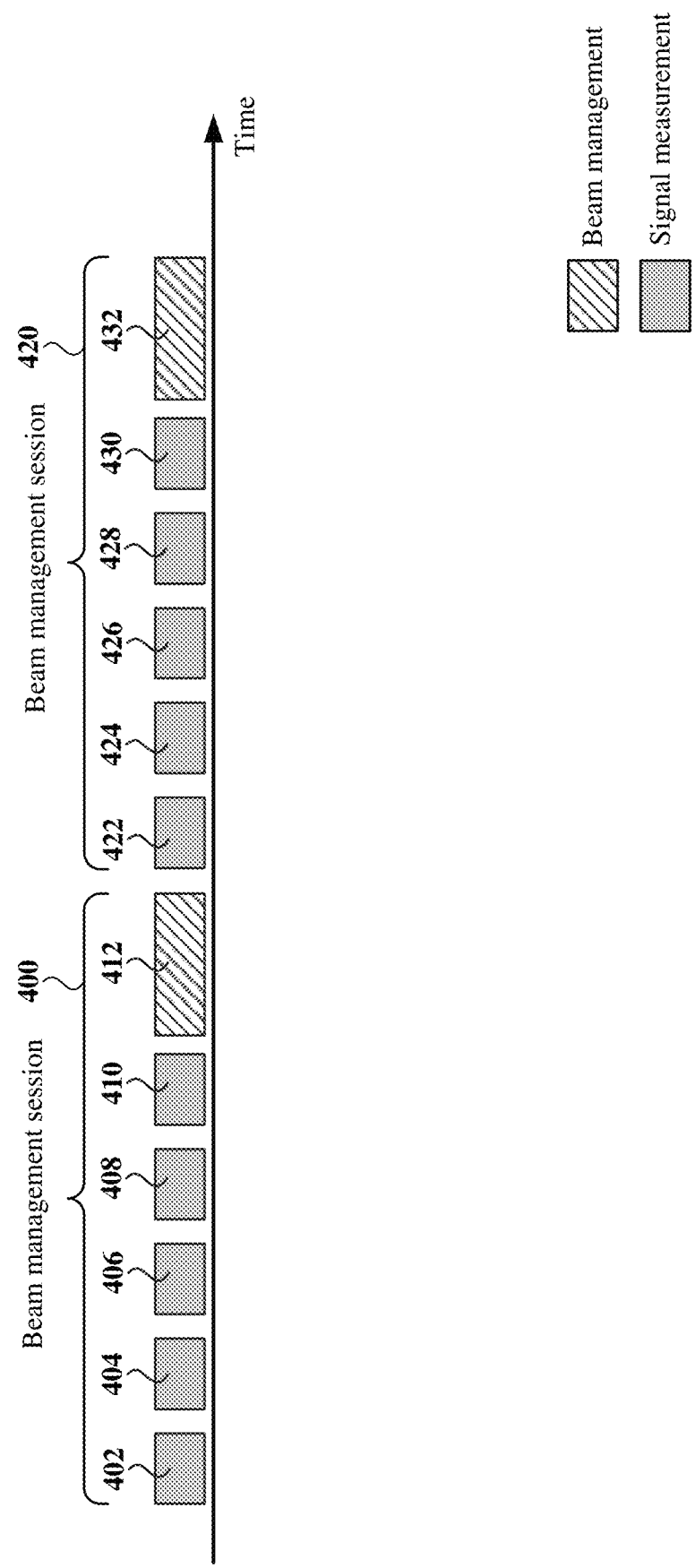
FIG. 4 illustrates example beam management sessions.

FIG. 4 illustrates example beam management sessions 400, 420. The beam management sessions 400, 420 may be performed by a UE and a base station. In some examples, the UE and the base station may periodically perform beam management sessions (e.g., beam management sessions 400, 420) to maintain proper beam alignment and acceptable communication link quality.

As shown in FIG. 4, a first beam management session 400 may include signal measurement periods 402, 404, 406, 408, 410 and a beam management period 412. A second beam management session 420 may include signal measurement periods 422, 424, 426, 428, 430 and a beam management period 432. During the signal measurement periods of a beam management session (e.g., the signal measurement periods 402, 404, 406, 408, 410 of the first beam management session 400), the UE may measure the strength of beamformed reference signals received from the base station. For example, during each of the signal measurement periods 402, 404, 406, 408, 410, the base station may transmit a beamformed CSI-RS signal and the UE may measure the corresponding received power of the beamformed CSI-RS signal. In some examples, the received power may be expressed as a signal-to-noise ratio (SNR), a signal-to-interference-plus-noise ratio (SINR), or other suitable metric.

In some examples, and as described in detail herein, a UE may be equipped with multiple antenna panels. Each of the multiple antenna panels may enable the UE to support multiple beams with respect to the base station. For example, during the signal measurement periods 402, 404, 406, 408, 410, the UE may measure the strength (e.g., received power) of beamformed reference signals (e.g., beamformed CSI-RS signals) transmitted from the base station for each of the multiple beams on one or more of the multiple antenna panels. In one example, if a UE is equipped with a first antenna panel supporting a first set of beams and a second antenna panel supporting a second set of beams, the UE may measure the strength of beamformed reference signals received for each of the first set of beams at the first antenna panel and for each of the second set of beams at the second antenna panel.

In some examples, during a beam management period (e.g., the beam management period 412), the UE may generate a beam management report that includes the measured strength (e.g., received power) of each beamformed reference signal received in each beam of the multiple antenna panels. In other examples, the UE may generate a beam management report that includes the N best measured strengths of beamformed reference signals received in the beams of each antenna panel, where N is a positive integer. The value of N may be preconfigured at the UE or set by the base station. In other examples, the UE may generate a beam management report that includes the N best measured strengths of beamformed reference signals received in the beams of the best antenna panels. The term best antenna panel as used herein may refer to an antenna panel having one or more beams providing a measured strength of a reference signal that is greater than the measured strengths of the reference signal in other beams on other antenna panels.

The UE may transmit the beam management report to the base station. The base station may select an antenna panel and beam combination that currently provides the best performance based on the measured strengths included in the beam management report. It should be noted that a measured strength of a reference signal on an antenna panel (e.g., as included in a beam management report) of the UE may indicate a specific beam on that antenna panel. The base station may configure the UE (e.g., when scheduling the UE for an uplink transmission) to use the selected antenna panel and beam combination for uplink transmissions. In some examples, the base station may also transmit data to the UE (e.g., in the downlink) on the selected beam.

In some scenarios, the UE may be subject to transmission power regulations. For example, the maximum transmission power of the UE may be set to an effective isotropic radiated power (EIRP) value $P_{EIRP}$. However, in the presence of human contact proximate to an antenna panel of the UE, the maximum transmission power of the UE with respect to that antenna panel may be set to a maximum permissible exposure (MPE) transmission power value $P_{MPE}$, where $P_{MPE} < P_{EIRP}$. The values of $P_{EIRP}$ and $P_{MPE}$ may be expressed in decibels per milliwatt (dBm). For example, $P_{EIRP}$ may be set to 25 dBm (e.g., $P_{EIRP}$=25 dBm) and $P_{MPE}$ may be set to 10 dBm (e.g., $P_{MPE}$=10 dBm). The value of $P_{MPE}$ can change depending on the proximity of a user to the UE. For example, the value of $P_{MPE}$ may decrease as a body part of a user (e.g., a finger) comes closer to a surface of the UE. For example, the UE may detect the proximity of a body part of a user with a proximity sensor (e.g., one or more detectors using radar type technologies). In some applications, the maximum permissible exposure (MPE) transmission power value $P_{MPE}$ may represent the maximum power that the UE can transmit over a time T. In one example, if the value of $P_{MPE}$ is set to 10 dBm and the time T is set to four seconds, the transmission power of the UE may not exceed 10 dBm as measured over four seconds in the presence of human contact.

Figure 5:
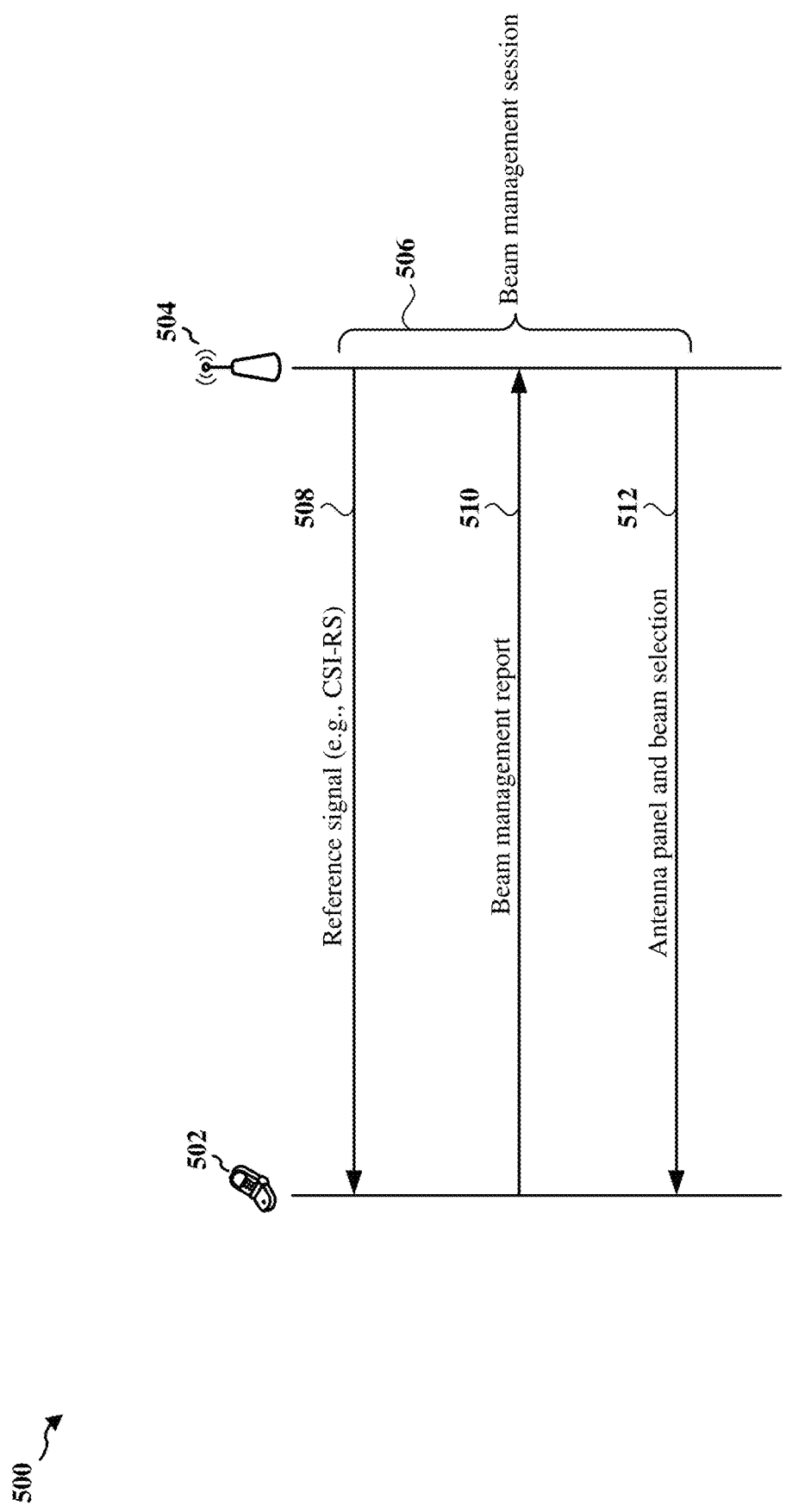
FIG. 5 is a signal flow diagram of an example beam management session.

FIG. 5 is a signal flow diagram 500 of an example beam management session. As shown in FIG. 5, during a beam management session 506, a base station 504 may transmit a reference signal 508 (e.g., a beamformed reference signal) to the UE 502. For example, the reference signal 508 may be a CSI-RS signal. The UE 502 may include multiple antenna panels, where each of the multiple antenna panels may support multiple beams. In some examples, the base station 504 may transmit the reference signal 508 in different beams. In some examples, the base station 504 may transmit the reference signal in all beams supported by all antenna panels of the UE 502. This is explained in greater detail with reference to FIG. 6.

Figure 6:
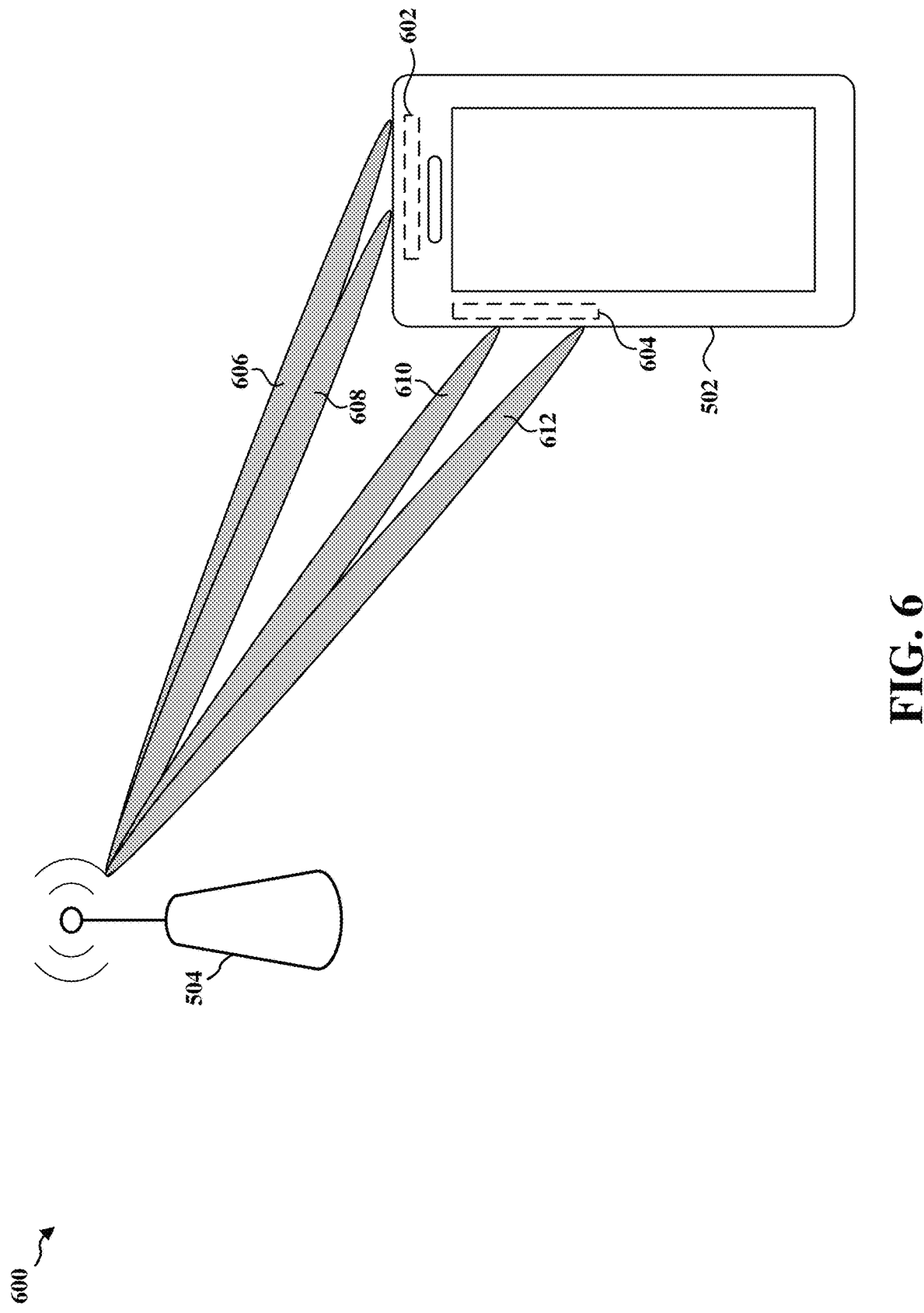
FIG. 6 illustrates an example wireless communication network including a user equipment (UE) and the base station.

FIG. 6 illustrates an example wireless communication network 600 including the UE 502 and the base station 504. In the example implementation of FIG. 6, the UE 502 includes two antenna panels, such as the first antenna panel (antenna panel_1) 602 and the second antenna panel (antenna panel_2) 604. The first antenna panel 602 may support a first beam 606 and a second beam 608, and the second antenna panel 604 may support a third beam 610 and a fourth beam 612. Therefore, in the example of FIG. 6, the base station 504 may transmit the reference signal 508 in the first beam 606, the second beam 608, the third beam 610, and the fourth beam 612.

Referring back to FIG. 5, the UE 502 may measure the strength of the reference signal 508 received in each beam of each antenna panel of the UE 502. The UE 502 may generate a beam management report 510 based on the measured strengths of the reference signal 508 and may transmit the beam management report 510 to the base station 504. The base station 504 may select the best antenna panel and beam (e.g., the antenna panel and beam that can provide the highest communication quality between the UE 502 and the base station 504) to be used by the UE 502 for uplink transmissions based on the beam management report 510. The base station may then transit the antenna panel and beam selection 512 to the UE 502. The base station 504 may configure the UE 502 to use the selected antenna panel and beam for uplink transmissions.

In scenarios where human contact is proximate to an antenna panel of the UE 502 and the maximum transmission power of the UE 502 with respect to that antenna panel is set to a maximum permissible exposure (MPE) limit (e.g., the MPE transmission power value $P_{MPE}$), the measured strength of a reference signal in a beam of that antenna panel may not be an accurate indication of the performance of the beam for uplink transmissions. Oftentimes, the MPE limit (e.g., the value of $P_{MPE}$) is lower than the measured strength of a reference signal in a beam and a base station may not have any mechanisms to detect that an antenna panel of a UE is subject to an MPE limit when there is a presence of human contact. Moreover, conventional beam management reporting formats may not enable a UE to indicate that an antenna panel is subject to an MPE limit. In other words, a base station may not be aware that an antenna panel of the UE is subject to an MPE limit. Therefore, in scenarios where human contact is proximate to an antenna panel of a UE, the antenna panel and beam combination selected by the base station for uplink transmissions at the UE may not actually be the best antenna panel and beam combination. This may prevent the UE and base station from achieving the highest possible communication quality. The aspects described herein may overcome these issues to enable a UE and a base station to communicate on the best antenna panel and beam in circumstances where the UE is subject to an MPE limit due to a presence of human contact.

FIG. 7 includes a diagram 700 illustrating an example beam management scenario for a UE (e.g., the UE 502 shown in FIGS. 5 and 6) having multiple antenna panels. In FIG. 7, P1 may represent the highest measured strength of a reference signal received in the beams of the first antenna panel (antenna panel_1) 602 of the UE 502, and P2 may represent the highest measured strength of the reference signal received in the beams of the second antenna panel (antenna panel_2) 604 of the UE 502. Therefore, P1 may represent the measured strength of the reference signal received in the best beam on antenna panel_1 602, and P2 may represent the measured strength of the reference signal received in the best beam on antenna panel_2 604. In the present scenario, the value of P1 is greater than the value of P2. In some examples, the term "P1" used herein may represent a first value (e.g., a number) in units of dBm, and the term "P2" may represent a second value (e.g., a number) in units of dBm.

If the UE 502 detects the presence of human contact near one or more of the antenna panels of the UE 502, the UE 502 may determine a maximum permissible exposure (MPE) transmission power back-off value (also herein referred to as a transmission power back-off value) for one or more of the antenna panels based on the previously described MPE transmission power value $P_{MPE}$. In some examples, the UE 502 may receive one or more MPE transmission power back-off values from the base station 504. In some implementations, the UE 502 may receive a set of MPE transmission power back-off values from the base station 504, where each MPE transmission power back-off value corresponds to a proximity of human contact. For example, the set of MPE transmission power back-off values may enable the UE 502 to apply larger MPE transmission power back-off values as the human contact (e.g., a finger or face of a user) gets closer to an antenna panel.

For example, with reference to FIG. 6, the UE 502 may determine a first MPE transmission power back-off value (e.g., backoff_1) for antenna panel_1 602, and a second MPE transmission power back-off value (e.g., backoff_2) for antenna panel_2 604. In some examples, the term "backoff_1" used herein may represent a value (e.g., a number) in units of dBm and may indicate the first MPE transmission power back-off value. The term "backoff_2" may represent a value (e.g., a number) in units of dBm and may indicate the second MPE transmission power back-off value. In one nonlimiting example, backoff_1 may be set to 3 dBm and backoff_2 may be set to 6 dBm.

As shown in FIG. 7, for each antenna panel, the UE 502 may determine a highest measured strength of the reference signal after accounting for the MPE limit (also referred to as an MPE transmission power back-off). In some examples, and as shown in FIG. 7, the UE 502 may determine the highest measured strength of the reference signal on antenna panel_1 602 after accounting for the MPE transmission power back-off by reducing the highest measured strength of the reference signal (e.g., P1) by the first MPE transmission power back-off value (e.g., backoff_1). For example, the UE 502 may determine the result of the expression P1−backoff_1. The UE 502 may further determine the highest measured strength of the reference signal on antenna panel_2 604 after accounting for the MPE transmission power back-off by reducing the highest measured strength of the reference signal (e.g., P2) by the second MPE transmission power back-off value (e.g., backoff_2). For example, the UE 502 may determine the result of the expression P2−backoff_2. For example, the results of the expressions P1−backoff_1 and P2−backoff_2 may herein be referred to as reduced highest measured strengths of the reference signal.

It should be noted that if the UE 502 performed an uplink transmission from the antenna panel_1 602 with an uplink transmission power of P1−backoff_1, the uplink transmission power (e.g., as measured over a period T) would not exceed the MPE transmission power value $P_{MPE}$. Moreover, if the UE 502 performed an uplink transmission from antenna panel_2 604 with an uplink transmission power of P2−backoff_2, the uplink transmission power (e.g., as measured over a period 7) would not exceed the MPE transmission power value $P_{MPE}$.

As previously described, in the example beam management scenario of FIG. 7, the UE measured strength P1 of the reference signal received in the best beam of the first antenna panel (antenna panel_1) 602 is greater than the measured strength P2 of the reference signal received in the best beam of the second antenna panel (antenna panel_2) 604. Moreover, the result of the expression P1−backoff_1 may be less than the result of the expression P2−backoff_2. Accordingly, since the value of P1 measured at the first antenna panel (antenna panel_1) 602 is greater than the value of P2 measured at the second antenna panel (antenna panel_2) 604, it would appear to the base station 504 that the best antenna panel is the first antenna panel (antenna panel_1) 602. However, after accounting for MPE limitations (e.g., the MPE transmission power back-off value), since P1−backoff_1 is less than P2−backoff_2 in the present scenario, the best antenna panel may be the second antenna panel (antenna panel_2) 604. Thus, if the base station 504 is not informed of any MPE limitations currently imposed on one or more of the antenna panels of the UE 502 due to human contact, the base station 504 may not be able to select the best antenna panel and beam combination for uplink transmissions at the UE 502.

Figure 8:
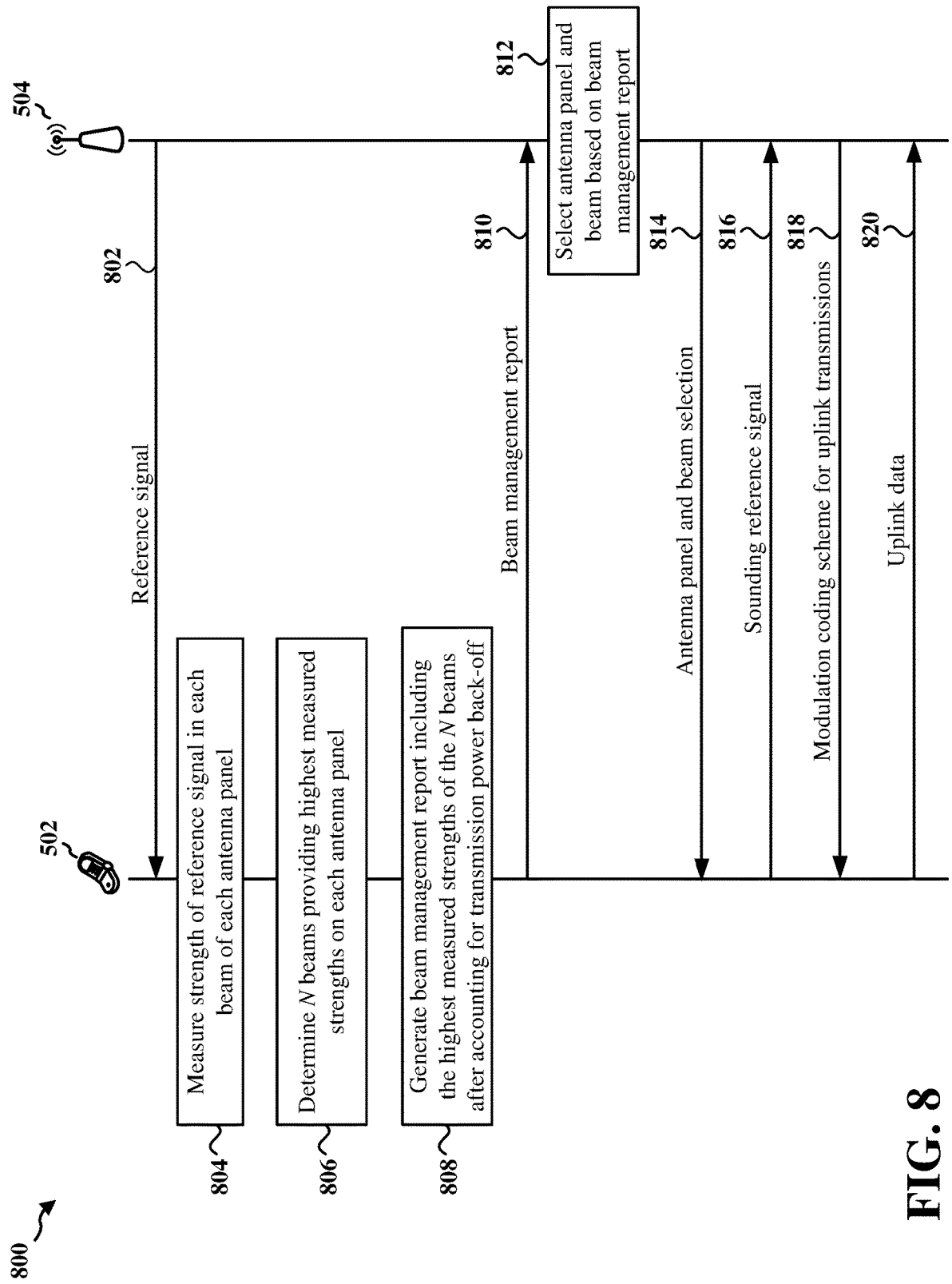
FIG. 8 is a signal flow diagram in accordance with various aspects of the present disclosure.

FIG. 8 is a signal flow diagram 800 in accordance with various aspects of the present disclosure. As shown in FIG. 8, the base station 504 may transmit a reference signal 802 to the UE 502. At 804, the UE 502 may measure the strength of the reference signal 802 in each beam of each antenna panel of the UE 502. For example, the UE 502 may measure the strength (e.g., the reference signal received power) of the reference signal 802 in each of the beams supported by the antenna panel_1 602 and in each of the beams supported by the antenna panel_2 604.

At 806, the UE 502 may determine N beams providing highest measured strengths of the reference signal 802 on each antenna panel, where N is a positive integer. The value of N may be preconfigured at the UE or set by the base station 504. If the UE 502 determines that a maximum permissible exposure (MPE) limit is to be applied to at least one of the antenna panels of the UE 502 for uplink transmissions, the UE 502 at 808 may generate a beam management report including the highest measured strengths of the N beams on the at least one of the antenna panels after accounting for an MPE limit. For example, in some aspects of the disclosure, the UE 502 may obtain the highest measured strengths of the reference signal in the N beams and may reduce the highest measured strengths by a transmission power back-off value to account for the MPE limit.

For example, if the measured strength of the reference signal 802 at antenna panel_1 602 is P1 and if the MPE transmission power back-off value determined for antenna panel_1 602 is backoff_1, the measured strength of the reference signal 802 after MPE transmission power back-off may be expressed as P1−backoff_1. Continuing with this example, if the measured strength of the reference signal 802 at antenna panel_2 604 is P2 and if the MPE transmission power back-off value determined for antenna panel_2 604 is backoff_2, the measured strength of the reference signal 802 after MPE transmission power back-off may be expressed as P2−backoff_2. In this example, $$P1 > P2 \text{ and } (P1-\text{backoff}\_1) < (P2-\text{backoff}\_2).$$

Figure 9:
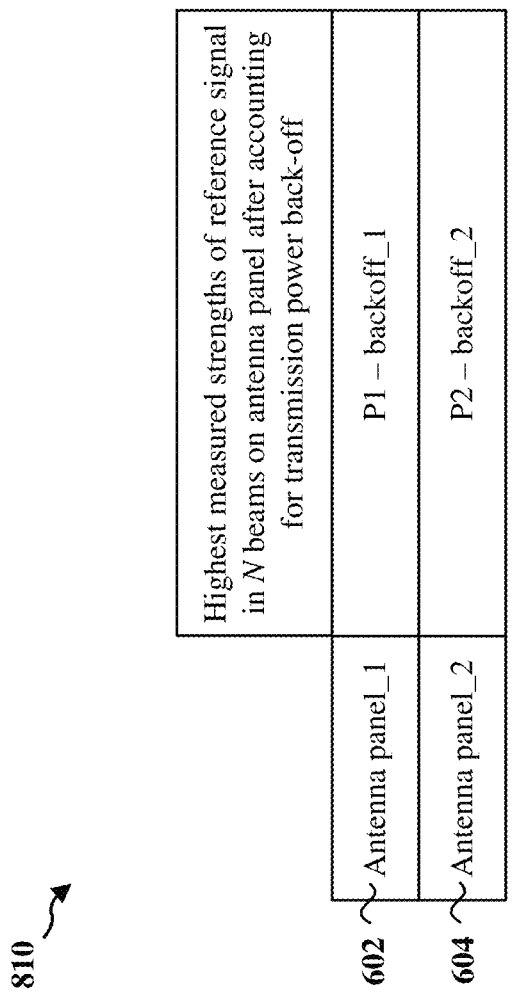
FIG. 9 is an example beam management report in accordance with various aspects of the disclosure.

An example beam management report 810 is shown in FIG. 9. In the example beam management report 810, N may be set to 1. The UE 502 may include the result of the expression P1−backoff_1 to indicate the highest measured strength of the reference signal 802 at antenna panel_1 602 after MPE transmission power back-off and may include the result of the expression P2−backoff_2 to indicate the highest measured strength of the reference signal 802 at antenna panel_2 604 after MPE transmission power back-off.

The UE 502 may transmit the beam management report 810 to the base station 504. The base station 504 may select an antenna panel and beam to be used for uplink transmissions at the UE 502 based on the beam management report 810. For example, with reference to the example beam management report 810 shown in FIG. 9, the base station 504 may decode the beam management report 810 to obtain the information included in the beam management report 810. Since (P1−backoff_1)<(P2−backoff_2), the base station 504 may select the antenna panel_2 604 and the beam having the best measured strength after MPE transmission power back-off (e.g., the beam providing the measured strength of P2−backoff_2). The base station 504 may transmit the antenna panel and beam selection 814 to the UE 502.

The UE 502 may transmit a sounding reference signal (SRS) 816 to the base station 504. For example, the UE 502 may transmit the SRS 816 using the antenna panel and beam selected by the base station 504 (e.g., the antenna panel_2 604 and the beam having the best measured strength after MPE transmission power back-off). The UE 502 may transmit the SRS 816 using a transmission power set to Pu−backoff_2 in order to receive a correct modulation and coding scheme (MCS) from the base station 504, where Pu is the maximum transmission power of the UE 502 and backoff_2 is the MPE transmission power back-off value for antenna panel_2 604.

The base station 504 may determine a modulation and coding scheme for uplink transmissions 818 based on the SRS 816 and may transmit the modulation and coding scheme for uplink transmissions 818 to the UE 502. The UE 502 may transmit uplink data 820 to the base station 504 using the antenna panel and beam selected by the base station 504 (e.g., the antenna panel_2 604 and the beam having the best measured strength after MPE transmission power back-off). The UE 502 may transmit the uplink data 820 (e.g., on PUSCH) using a transmission power set to the result of the expression Pu−backoff_2.

Figure 10:
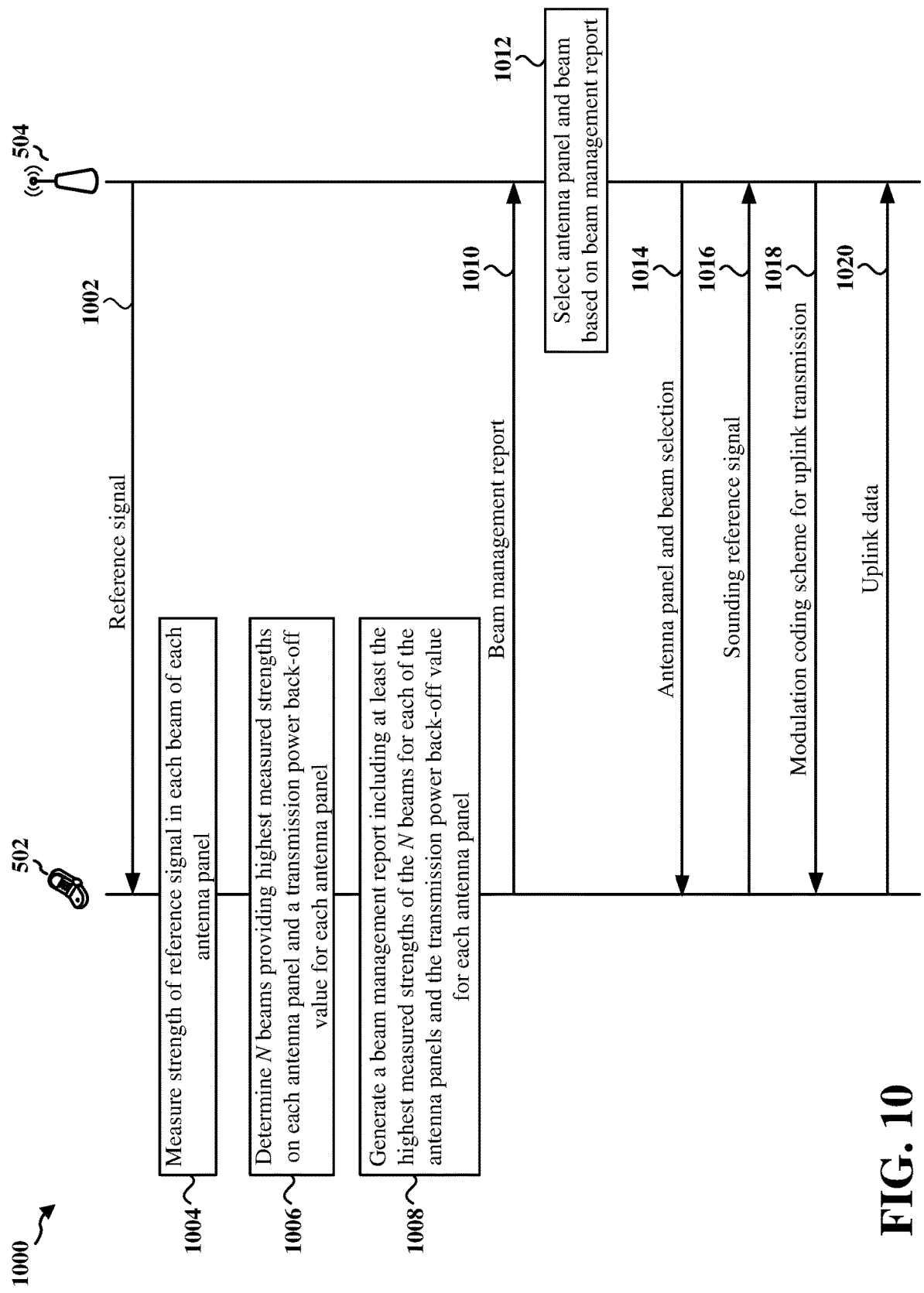
FIG. 10 is a signal flow diagram in accordance with various aspects of the present disclosure.

FIG. 10 is a signal flow diagram 1000 in accordance with various aspects of the present disclosure. As shown in FIG. 10, the base station 504 may transmit a reference signal 1002 to the UE 502. At 1004, the UE 502 may measure the strength of the reference signal 1002 in each beam of each antenna panel of the UE 502. For example, the UE 502 may measure the strength (e.g., the reference signal received power) of the reference signal 1002 in each of the beams supported by the antenna panel_1 602 and in each of the beams supported by the antenna panel_2 604.

At 1006, the UE 502 may determine 1006 N beams providing highest measured strengths on each of its antenna panels, where N is a positive integer. The value of N may be set by the base station 504. The UE 502 may further determine a transmission power back-off value for each antenna panel.

For example, the UE 502 may determine that the highest measured strength of the reference signal 1002 in a beam at antenna panel_1 602 is P1 and that the highest measured strength of the reference signal 1002 in a beam at antenna panel_2 604 is P2. The UE 502 may further determine an MPE transmission power back-off value backoff_1 for antenna panel_1 602 and an MPE transmission power back-off value backoff_2 for antenna panel_2 604. In one example, P1>P2 and (P1−backoff_1)<(P2−backoff_2). In some examples, the value of backoff_1 may be represented with a first multi-bit binary value and the value of backoff_2 may be represented with a second multi-bit binary value. In some examples, the value of backoff_1 may be different from the value of backoff_2.

At 1008, the UE 502 may generate a beam management report including at least the highest measured strengths of the N beams for each of the plurality of antenna panels and the transmission power back-off value for each antenna panel. An example beam management report 1010 is shown in FIG. 11. In FIG. 11, the beam management report 1010 may include the highest measured strength of the reference signal 1002 (e.g., P1) on antenna panel_1 602 and the MPE transmission power back-off value (e.g., backoff_1) for antenna panel_1 602, and the highest measured strength of the reference signal 1002 (e.g., P2) on antenna panel_2 604 and the MPE transmission power back-off value (e.g., backoff_2) for antenna panel_2 604. The UE 502 may transmit the beam management report 1010 to the base station 504. In some aspects of the disclosure, if there is no human contact proximate to an antenna panel of the UE 502, the MPE transmission power back-off value for that antenna panel may be indicated as zero in the beam management report 1010.

The base station 504 may select 1012 an antenna panel and beam to be used for uplink transmissions at the UE 502 based on the beam management report 1010. For example, with reference to the example beam management report 1010 shown in FIG. 11, the base station 504 may decode the beam management report 1010 to obtain the information included in the beam management report 1010. The base station 504 may determine the highest measured strength of the reference signal 1002 in a beam of antenna panel_1 602 after MPE transmission power back-off by reducing the value of P1 by the MPE transmission power back-off value backoff_1 (e.g., (P1−backoff_1). The base station 504 may further determine the highest measured strength of the reference signal 1002 in a beam of antenna panel_2 604 after MPE transmission power back-off by reducing the value of P2 by the MPE transmission power back-off value backoff_2 (e.g., P2−backoff_2). In this example, if P1>P2 and (P1−backoff_1)<(P2−backoff_2), the base station 504 may determine that the best measured strength of the reference signal 1002 after MPE transmission power back-off on the best antenna panel may be P2−backoff_2 on antenna panel_2 604, despite that P1 is greater than P2. The base station 504 may transmit the antenna panel and beam selection 1014 to the UE 502.

The UE 502 may transmit a sounding reference signal (SRS) 1016 to the base station 504. For example, the UE 502 may transmit the SRS 1016 using the antenna panel and beam selected by the base station 504 (e.g., the antenna panel_2 604 and the beam having the highest measured strength after MPE transmission power back-off (e.g., P2−backoff_2)). The UE 502 may transmit the SRS 1016 using a transmission power set to Pu−backoff_2 in order to receive a correct modulation and coding scheme (MCS) from the base station 504, where Pu is the maximum transmission power of the UE 502 and backoff_2 is the MPE transmission power back-off value for antenna panel_2 604. In some examples, Pu may represent a number in units of dBm.

The base station 504 may determine a modulation and coding scheme for uplink transmissions 1018 based on the SRS 1016 and may transmit the modulation and coding scheme for uplink transmissions 1018 to the UE 502. The UE 502 may transmit uplink data 1020 to the base station 504 using the antenna panel and beam selected by the base station 504 (e.g., the antenna panel_2 604 and the beam having the highest measured strength after MPE transmission power back-off (e.g., P2−backoff_2)). The UE 502 may transmit the uplink data 1020 (e.g., on PUSCH) using a transmission power set to the result of the expression Pu−backoff_2.

In some aspects of the disclosure, the beam management report 1010 may allow the base station 504 to select the best antenna panel and beam of the UE 502 for downlink transmissions, which may be different from the best antenna panel and beam of the UE 502 selected for uplink transmissions. For example, because the beam management report 1010 includes the highest measured strength of the reference signal 1002 (e.g., P1) and the MPE transmission power back-off value (e.g., backoff_1) for antenna panel_1 602, and the highest measured strength of the reference signal 1002 (e.g., P2) and the MPE transmission power back-off value (e.g., backoff_2) for antenna panel_2 604, the base station 504 may select antenna panel_1 602 for downlink transmissions given that P1>P2 and that the MPE limitations may not be applicable to downlink transmissions. This way, the UE 502 may use antenna panel_2 604 to achieve the best communication quality for uplink transmissions and may use the antenna panel_1 602 to achieve the best communication quality for downlink transmissions.

Figure 12:
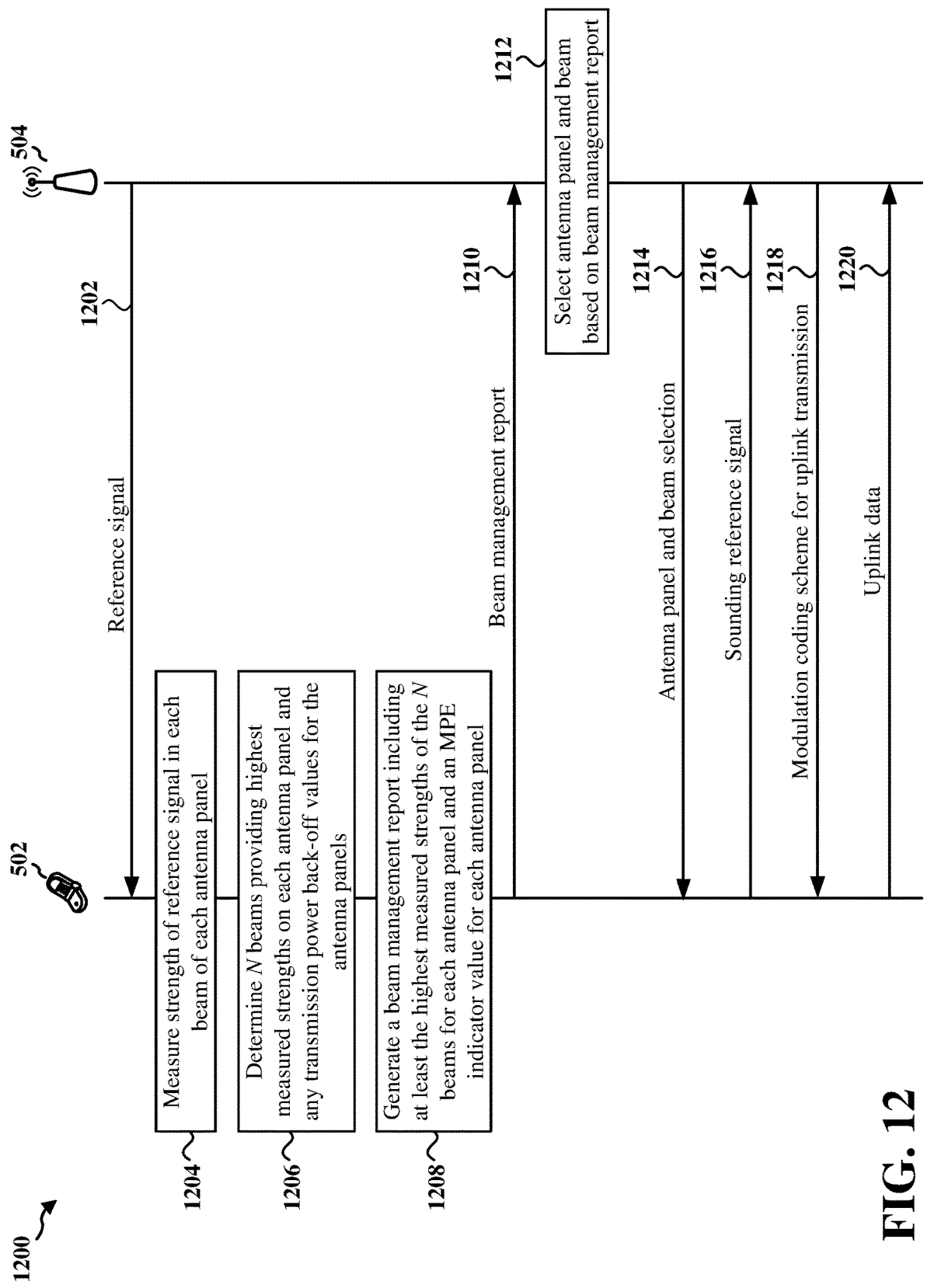
FIG. 12 is a signal flow diagram in accordance with various aspects of the present disclosure.

FIG. 12 is a signal flow diagram 1200 in accordance with various aspects of the present disclosure. As shown in FIG. 12, the base station 504 may transmit a reference signal 1202 to the UE 502. At 1204, the UE 502 may measure the strength of the reference signal 1202 in each beam of each antenna panel of the UE 502. For example, the UE 502 may measure the strength (e.g., the reference signal received power) of the reference signal 1202 in each of the beams supported by the antenna panel_1 602 and in each of the beams supported by the antenna panel_2 604.

At 1206, the UE 502 may determine N beams providing the highest measured strengths on each antenna panel and any transmission power back-off values for the antenna panels, where N is a positive integer. The value of N may be preconfigured at the UE or set by the base station 504. The UE 502 may further determine an MPE transmission power back-off value for each antenna panel that is proximate to human contact.

For example, the UE 502 may determine that the highest measured strength of the reference signal 1202 at antenna panel_1 602 is P1 and that the highest measured strength of the reference signal 1202 at antenna panel_2 604 is P2. The UE 502 may further determine an MPE transmission power back-off value backoff_1 for antenna panel_1 602 and an MPE transmission power back-off value backoff_2 for antenna panel_2 604. In one example, P1>P2 and (P1−backoff_1)<(P2−backoff_2).

At 1208, the UE 502 may generate a beam management report including at least the highest measured strengths of the N beams for each antenna panel and an MPE indicator for each antenna panel. The MPE indicator may indicate whether an antenna panel is preferred or nonpreferred for uplink transmissions. In some implementations, a value of the MPE indicator (also referred to as an MPE indicator value) may be represented as a single bit, where a first value of the single bit (e.g., '1') indicates that an antenna panel is preferred for uplink transmissions and a second value (e.g., '0') of the single bit indicates that the antenna panel is nonpreferred for uplink transmissions. Since the value of the MPE indicator may be represented using a single bit, the beam management report 1210 may be more robust than other beam management reports in some scenarios. For example, the single bit representing the value of the MPE indicator in the beam management report 1210 may be less prone to corruption due to interference during wireless transmission.

In some aspects of the disclosure, the UE 502 may determine the value of the MPE indicator by identifying an antenna panel of the UE 502 providing a highest measured strength of the reference signal 1202 after accounting for a transmission power back-off value. The UE 502 may set a value of the MPE indicator (also referred to as an MPE indicator value) for the identified antenna panel to a first value (e.g., '1') to indicate that the identified antenna panel is a preferred antenna panel for uplink transmissions. The UE 502 may set a value of the MPE indicator (also referred to as an MPE indicator value) for remaining antenna panels of the UE 502 to a second value (e.g., '0') to indicate that the remaining antenna panels are nonpreferred antenna panels for uplink transmissions.

An example beam management report 1210 is shown in FIG. 13. As shown in FIG. 13, the beam management report 1210 may include the highest measured strength of the reference signal 1202 (e.g., P1) and an MPE indicator (e.g., set to '0') for antenna panel_1 602 and the highest measured strength of the reference signal 1202 (e.g., P2) and the MPE indicator (e.g., set to '1') for antenna panel_2 604. The UE 502 may transmit the beam management report 1210 to the base station 504.

The base station 504 may select 1212 an antenna panel and beam to be used for uplink transmissions at the UE 502 based on the beam management report 1210. For example, with reference to the example beam management report 1210 shown in FIG. 13, the base station 504 may decode the beam management report 1210 to obtain the information included in the beam management report 1210. The base station 504 may then identify a value of an MPE indicator in the beam management report 1210 that indicates a preferred antenna panel (e.g., an antenna panel having a value of the MPE indicator set to '1'). The base station 504 may select the preferred antenna panel and the best beam on that preferred antenna panel for uplink transmissions at the UE 502. For example, with reference to the beam management report 1210, since the value of the MPE indicator for antenna panel_2 604 is set to 1, the base station 504 may determine that the antenna panel_2 604 is the preferred antenna panel. The base station 504 may then select the antenna panel_2 604 and the beam having the highest measured strength of the reference signal 1202 on antenna panel_2 (e.g., the beam associated with the measured strength P2). The base station 504 may transmit the antenna panel and beam selection 1214 to the UE 502.

The UE 502 may transmit a sounding reference signal (SRS) 1216 to the base station 504. For example, the UE 502 may transmit the SRS 1216 using the antenna panel and beam selected by the base station 504 (e.g., the antenna panel_2 604 and the beam providing the highest measured strength after MPE transmission power back-off). The UE 502 may transmit the SRS 1216 using a transmission power set to Pu−backoff_2 in order to receive a correct modulation and coding scheme (MCS) from the base station 504, where Pu is the maximum transmission power of the UE 502 and backoff_2 is the MPE transmission power back-off value for antenna panel_2 604.

The base station 504 may determine a modulation and coding scheme for uplink transmissions 1218 based on the SRS 1216 and may transmit the modulation and coding scheme for uplink transmissions 1218 to the UE 502. The UE 502 may transmit uplink data 1220 to the base station 504 using the antenna panel and beam selected by the base station 504 (e.g., the antenna panel_2 604 and the beam providing the highest measured strength of the reference signal 1202). The UE 502 may transmit the uplink data 1220 (e.g., on PUSCH) using a transmission power set to the result of the expression Pu−backoff_2.

In some aspects of the disclosure, the beam management report 1210 may allow the base station 504 to select the best antenna panel and beam of the UE 502 for downlink transmissions, which may be different from the best antenna panel and beam of the UE 502 selected for uplink transmissions. For example, because the beam management report 1210 includes the highest measured strength of the reference signal 1202 (e.g., P1) for antenna panel_1 602, the highest measured strength of the reference signal 1202 (e.g., P2) for antenna panel_2 604, and the preferred antenna panel for uplink transmissions, the base station 504 may select antenna panel_1 602 for downlink transmissions given that P1>P2. This way, the UE 502 may use antenna panel_2 604 to achieve the best communication quality for uplink transmissions and may use the antenna panel_1 602 to achieve the best communication quality for downlink transmissions.

Figure 14:
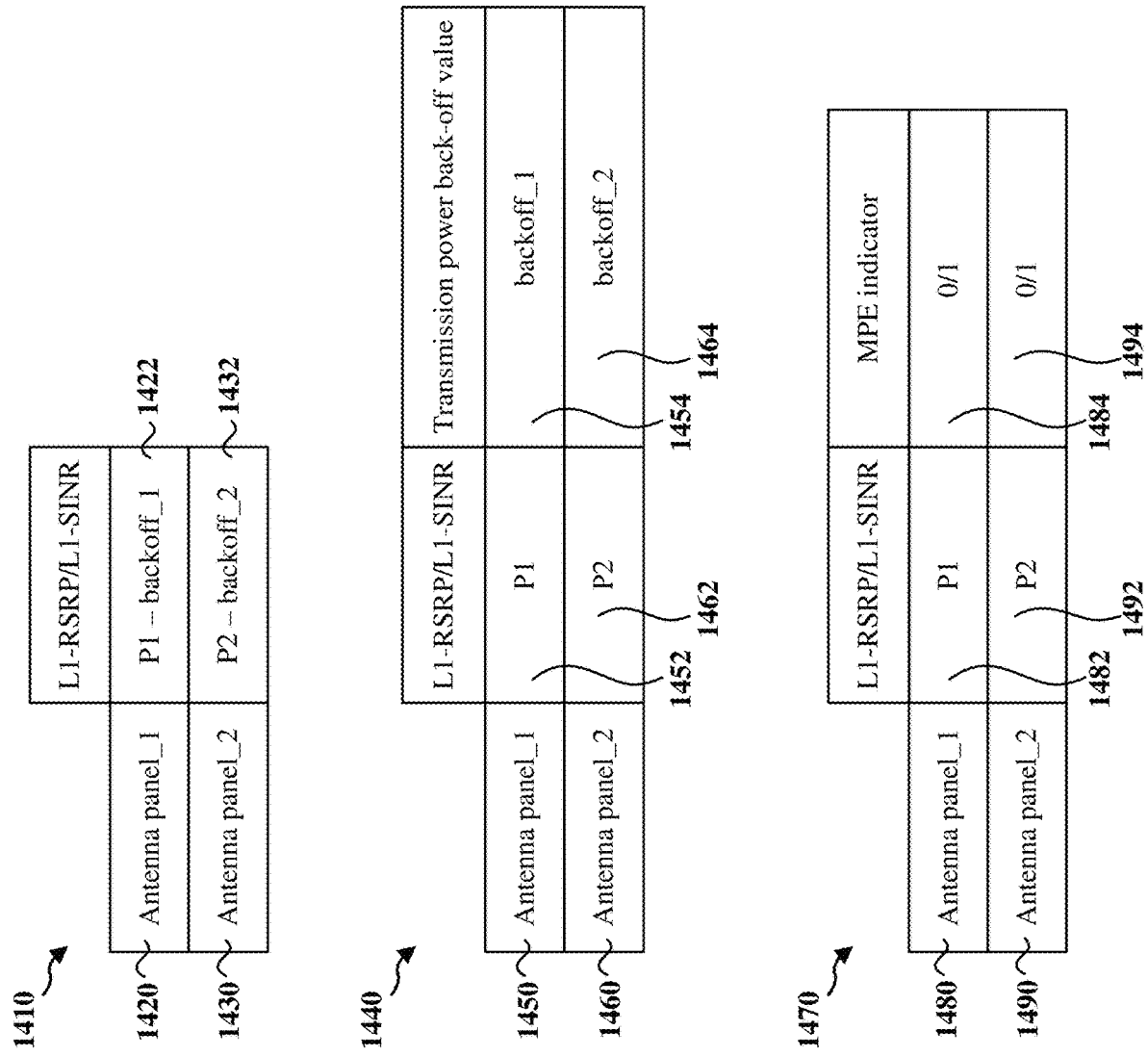
FIG. 14 illustrates example beam management reports in accordance with various aspects of the disclosure.

FIG. 14 illustrates example beam management reports in accordance with various aspects of the present disclosure. As shown in FIG. 14, a first example beam management report 1410 from a UE having two antenna panels (e.g., UE 502 having antenna panel_1 602 and antenna panel_2 604) may include a field (e.g., field 1420, 1430) for indicating an antenna panel of the UE. The first example beam management report 1410 may further include a field (e.g., field 1422, 1432) for indicating a best layer 1 reference signal received power (L1-RSRP) after accounting for the MPE transmission power back-off or a layer 1 signal-to-interference-plus-noise ratio (L1-SINR) after accounting for MPE transmission power back-off for an antenna panel.

For example, the L1-RSRP value or the L1-SINR value for antenna panel_1 may be P1, and the MPE transmission power back-off value for antenna panel_1 may be backoff_1. Accordingly, the L1-RSRP or L1-SINR after accounting for the MPE transmission power back-off for antenna panel_1 may be the result of the expression P1−backoff_1 as included in field 1422. As further shown in FIG. 14, the L1-RSRP value or the L1-SINR value for antenna panel_2 may be P2 and the MPE transmission power back-off value for antenna panel_2 may be backoff_2. Accordingly, the L1-RSRP or L1-SINR after accounting for the MPE transmission power back-off for antenna panel_2 604 may be the result of the expression P2−backoff_2 as included in field 1432.

As further shown in FIG. 14, a second example beam management report 1440 from a UE having two antenna panels (e.g., UE 502 having antenna panel_1 602 and antenna panel_2 604) may include a field (e.g., field 1450, 1460) for indicating an antenna panel of the UE, a field (e.g., field 1452, 1462) for indicating a best L1-RSRP or L1-SINR for an antenna panel, and a field (e.g., field 1454, 1464) for indicating an MPE transmission power back-off value for an antenna panel of the UE. For example, the L1-RSRP value or the L1-SINR value for antenna panel_1 may be P1 as indicated in the field 1452 and the MPE transmission power back-off value for antenna panel_1 may be backoff_1 as indicated in the field 1454. As further shown in FIG. 14, the L1-RSRP value or the L1-SINR value for antenna panel_2 may be P2 as indicated in the field 1462 and the MPE transmission power back-off value for antenna panel_2 may be backoff_2 as indicated in the field 1464.

As further shown in FIG. 14, a third example beam management report 1470 from a UE having two antenna panels (e.g., UE 502 having antenna panel_1 602 and antenna panel_2 604) may include a field (e.g., field 1480, 1490) for indicating an antenna panel of the UE, a field (e.g., field 1482, 1492) for indicating a best L1-RSRP or L1-SINR for an antenna panel, and a field (e.g., field 1484, 1494) for indicating a value of an MPE indicator for an antenna panel of the UE. For example, the L1-RSRP value or the L1-SINR value for antenna panel_1 may be P1 as indicated in the field 1482 and the value of the MPE indicator for antenna panel_1 may be a single bit set to '1' or '0' as indicated in the field 1484. As further shown in FIG. 14, the L1-RSRP value or the L1-SINR value for antenna panel_2 may be P2 as indicated in the field 1492 and the value of the MPE indicator for antenna panel_2 may be a single bit set to '1' or '0' as indicated in the field 1494. In one example implementation, a value of an MPE indicator set to '1' may indicate a preferred antenna panel of the UE for uplink transmissions, while a value of an MPE indicator set to '0' may indicate a non-preferred antenna panel of the UE for uplink transmissions.

Therefore, each of the example beam management reports 1410, 1440, 1470 in FIG. 14 account for MPE limits that may be imposed on antenna panels of a UE due to proximate human contact, which may enable a base station to select the best antenna panel and beam combinations for uplink transmissions. It should be noted that since conventional beam management reports may not account for such MPE limits, a base station may not be able to select the best antenna panel and beam combination for uplink transmissions when using the conventional beam management reports during beam management. As a result, the UE and base station may not achieve the highest communication quality using the conventional beam management reports.

The beam management reports described herein (e.g., beam management reports 810, 1010, 1210) may indicate a best beam on an antenna panel using a highest measured strength or a reduced highest measured strength of a reference signal received in a beam. In other aspects of the disclosure, the beam management reports may include additional information for indicating a beam providing a highest measured strength or a reduced highest measured strength of a reference signal, such as an index value associated with a beam.

Figure 15:
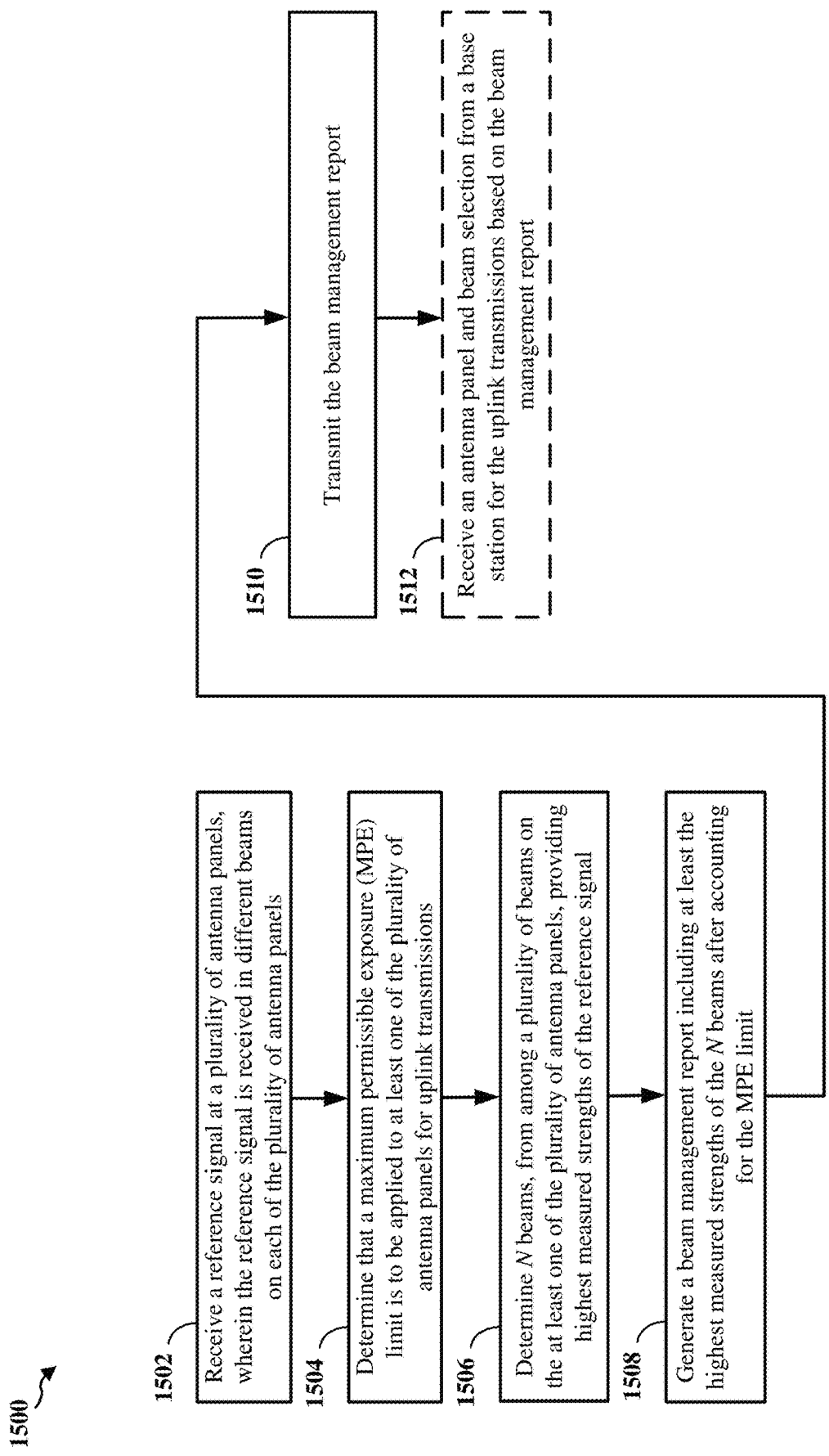
FIG. 15 is a flowchart of a method of wireless communication in accordance with various aspects of the disclosure.

FIG. 15 is a flowchart 1500 of a method of wireless communication. The method may be performed by a UE (e.g., the UE 104, 502; the apparatus 2102/2102'; the processing system 2214, which may include the memory 360 and which may be the entire UE or a component of the UE, such as the TX processor 368, the RX processor 356, and/or the controller/processor 359). In FIG. 15, blocks indicated with dashed lines represent optional blocks.

At 1502, the UE receives a reference signal (e.g., reference signal 802) at a plurality of antenna panels (e.g., antenna panel_1 602, antenna panel_2 604), wherein the reference signal is received in different beams (e.g., beams 606, 608, 610, 612) on each of the plurality of antenna panels. For example, with reference to FIGS. 6 and 8, the UE 502 may receive the reference signal 802 in beams 606, 608 at antenna panel_1 602, and may receive the reference signal 802 in beams 610, 612 at antenna panel_2 604. In some examples, the reference signal 802 may be a CSI-RS. In some examples, the UE 502 may receive multiple transmissions of the reference signal 802 in different beams at different times. In these examples, the UE 502 may receive a first transmission of the reference signal 802 in the first beam 606 at antenna panel_1 602, a second transmission of the reference signal 802 in the second beam 608 at antenna panel_1 602, a third transmission of the reference signal 802 in the third beam 610 at antenna panel_2 604, and a fourth transmission of the reference signal 802 in the fourth beam 612 at antenna panel_2 604.

At 1504, the UE determines that a maximum permissible exposure (MPE) limit is to be applied to at least one of the plurality of antenna panels for uplink transmissions. In some aspects of the disclosure, the UE may determine that the MPE limit is to be applied based on a control signal from a proximity sensor (e.g., one or more detectors using radar type technologies) configured to detect a proximate human contact to the UE.

At 1506, the UE determines N beams, from among a plurality of beams on the at least one of the plurality of antenna panels, providing highest measured strengths of the reference signal. For example, with reference to FIG. 6, the UE 502 may measure a strength of a reference signal received in each beam on each antenna panel. In one example scenario, the UE may determine one beam (e.g., N=1) from the first and second beams 606, 608 providing the highest measured strength of the reference signal on antenna panel_1 602, and one beam (e.g., N=1) from the third and fourth beams 610, 612 providing the highest measured strength of the reference signal on antenna panel_2 604. In this example scenario, the UE may determine that a measured strength P1 of the reference signal in the second beam 608 is the highest measured strength of the reference signal on antenna panel_1 602, and may determine that a measured strength P2 of the reference signal in the third beam 610 is the highest measured strength of the reference signal on antenna panel_2 604. For example, as shown in beam management report 810, a highest measured strength of the reference signal on antenna panel_1 602 may be P1, and a highest measured strength of the reference signal on antenna panel_2 604 may be P2.

At 1508, the UE generates a beam management report (e.g., beam management report 810) including at least the highest measured strengths of the N beams after accounting for the MPE limit. In some aspects of the disclosure, the UE generates the beam management report by obtaining the highest measured strengths of the reference signal in the N beams, and by reducing the highest measured strengths by a transmission power back-off value to account for the MPE limit. For example, with reference to FIG. 9, the UE may determine the highest measured strength of the reference signal on antenna panel_1 602 after accounting for the MPE transmission power back-off by reducing the highest measured strength of the reference signal (e.g., P1) by the first MPE transmission power back-off value (e.g., P1−back-off_1). The UE 502 may further determine the highest measured strength of the reference signal (e.g., P2) on antenna panel_2 604 after accounting for the MPE transmission power back-off by reducing the highest measured strength of the reference signal by the second MPE transmission power back-off value (e.g., P2−backoff_2).

At 1510, the UE transmits the beam management report. For example, the UE may transmit the beam management report 810 shown in FIG. 9. In should be understood that the beam management report 810 shown in FIG. 9 includes the result of the expression P1−backoff_1 for antenna panel_1 602 and the result of the expression P2−backoff_2 for antenna panel_2 604.

At 1512, the UE receives an antenna panel and beam selection from a base station for the uplink transmissions based on the beam management report. For example, with reference to FIG. 8, the base station 504 at 812 may select an antenna panel and beam to be used for uplink transmissions at the UE 502 based on the beam management report 810. The UE may receive the antenna panel and beam selection 814 from the base station 504.

Figure 16:
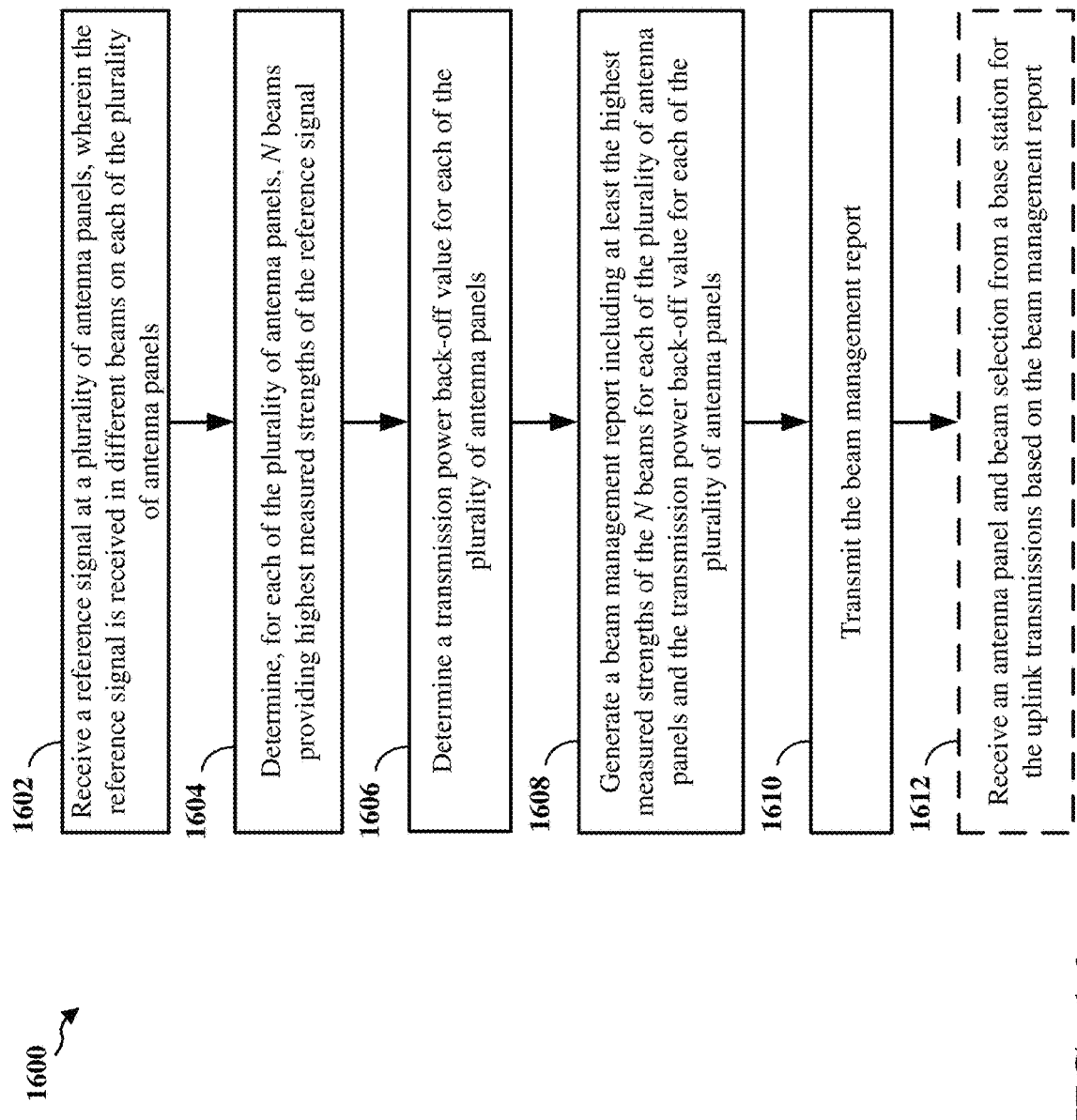
FIG. 16 is a flowchart of a method of wireless communication in accordance with various aspects of the disclosure.

FIG. 16 is a flowchart 1600 of a method of wireless communication. The method may be performed by a UE (e.g., the UE 104, 502; the apparatus 2102/2102'; the processing system 2214, which may include the memory 360 and which may be the entire UE or a component of the UE, such as the TX processor 368, the RX processor 356, and/or the controller/processor 359). In FIG. 16, blocks indicated with dashed lines represent optional blocks.

At 1602, the UE receives a reference signal (e.g., reference signal 1002) at a plurality of antenna panels (e.g., antenna panel_1 602, antenna panel_2 604), wherein the reference signal is received in different beams (e.g., beams

606, 608, 610, 612) on each of the plurality of antenna panels. For example, with reference to FIGS. 6 and 10, the UE 502 may receive the reference signal 1002 in beams 606, 608 at antenna panel_1 602, and may receive the reference signal 1002 in beams 610, 612 at antenna panel_2 604. In some examples, the reference signal 1002 may be a CSI-RS. In some examples, the UE 502 may receive multiple transmissions of the reference signal 1002 in different beams at different times. In these examples, the UE 502 may receive a first transmission of the reference signal 1002 in the first beam 606 at antenna panel_1 602, a second transmission of the reference signal 1002 in the second beam 608 at antenna panel_1 602, a third transmission of the reference signal 1002 in the third beam 610 at antenna panel_2 604, and a fourth transmission of the reference signal 1002 in the fourth beam 612 at antenna panel_2 604.

At 1604, the UE determines, for each of the plurality of antenna panels, N beams providing highest measured strengths of the reference signal. In some examples, the UE 502 may measure a strength of a reference signal received in each beam on each antenna panel. In one example scenario, the UE may determine one beam (e.g., N=1) from the first and second beams 606, 608 providing the highest measured strength of the reference signal (e.g., reference signal 1002) on antenna panel_1 602, and one beam (e.g., N=1) from the third and fourth beams 610, 612 providing the highest measured strength of the reference signal (e.g., reference signal 1002) on antenna panel_2 604. In this example scenario, the UE may determine that a measured strength P1 of the reference signal in the second beam 608 is the highest measured strength of the reference signal on antenna panel_1 602, and may determine that a measured strength P2 of the reference signal in the third beam 610 is the highest measured strength of the reference signal on antenna panel_2 604.

At 1606, the UE determines a transmission power back-off value for each of the plurality of antenna panels. In some examples, the UE may receive one or more MPE transmission power back-off values from the base station (e.g., base station 504). In some implementations, the UE may receive a set of MPE transmission power back-off values from the base station 504, where each MPE transmission power back-off value corresponds to a proximity of human contact. For example, the set of MPE transmission power back-off values may enable the UE 502 to apply larger MPE transmission power back-off values as the human contact (e.g., a finger or face of a user) gets closer to an antenna panel. In some aspects of the disclosure, the transmission power back-off value is set to zero for any of the plurality of antenna panels excluded from a maximum permissible exposure (MPE) limit. For example, as shown in beam management report 1010, a transmission power back-off value for antenna panel_1 602 may be backoff_1 and a transmission power back-off value for antenna panel_2 604 may be backoff_2.

At 1608, the UE generates a beam management report (e.g., beam management report 1010) including at least the highest measured strengths of the N beams for each of the plurality of antenna panels and the transmission power back-off value for each of the plurality of antenna panels. For example, as shown in FIG. 11, the beam management report 1010 includes P1 and backoff_1 for antenna panel_1 602, where P1 represents the highest measured strength of the reference signal on antenna panel_1 602 and backoff_1 represents the transmission power back-off value for antenna panel_1 602. The beam management report 1010 further includes P2 and backoff_2 for antenna panel_2 604, where P2 represents the highest measured strength of the reference signal on antenna panel_2 604 and backoff_2 represents the transmission power back-off value for antenna panel_2 604.

At 1610, the UE transmits a beam management report. For example, the UE may transmit the beam management report 1010 shown in FIG. 11.

At 1612, the UE receives an antenna panel and beam selection from a base station for the uplink transmissions based on the beam management report. For example, with reference to FIG. 10, the base station 504 at 1012 may select an antenna panel and beam to be used for uplink transmissions at the UE 502 based on the beam management report 1010. The UE may receive the antenna panel and beam selection 1014 from the base station 504.

Figure 17:
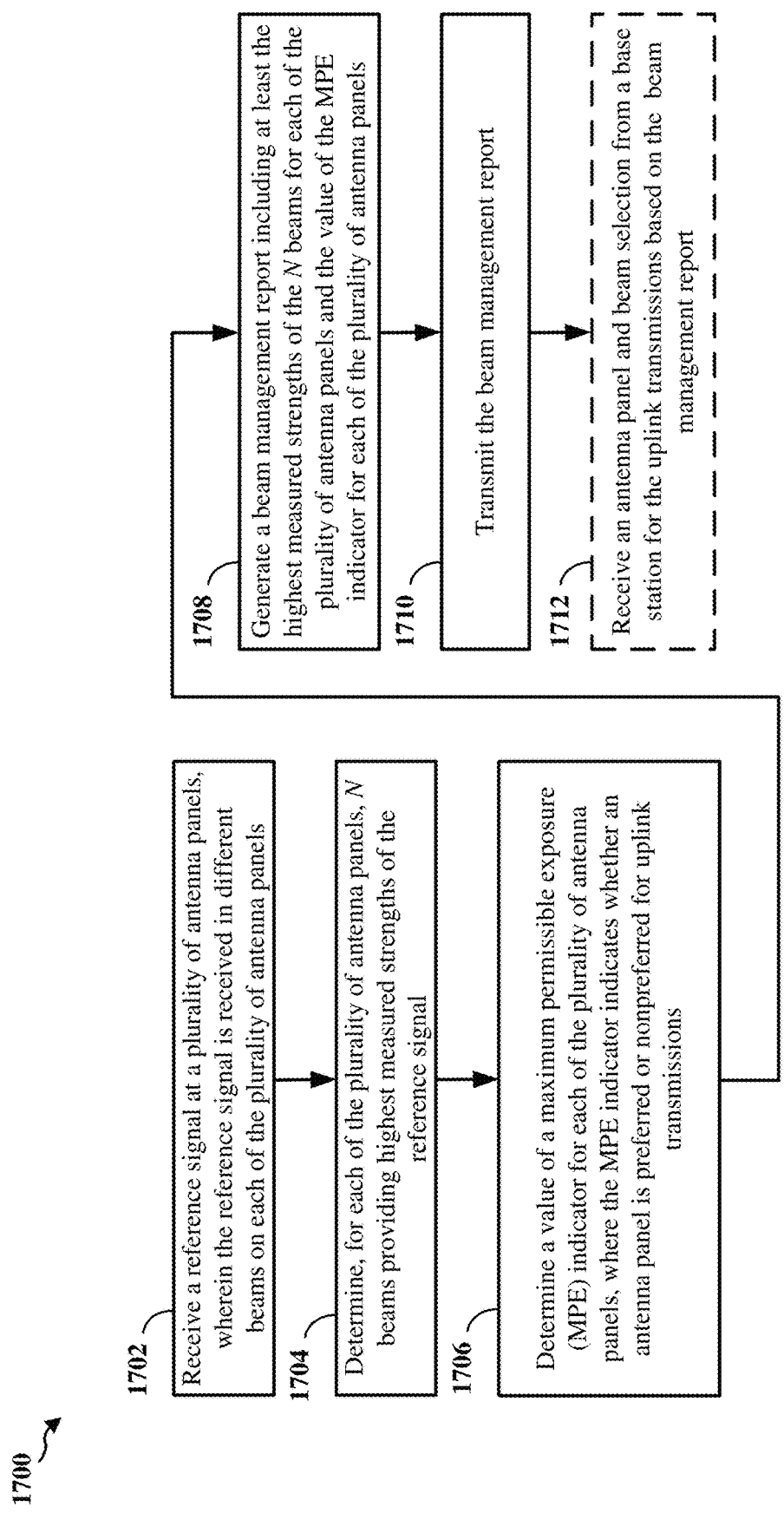
FIG. 17 is a flowchart of a method of wireless communication in accordance with various aspects of the disclosure.

FIG. 17 is a flowchart 1700 of a method of wireless communication. The method may be performed by a UE (e.g., the UE 104, 502; the apparatus 2102/2102'; the processing system 2214, which may include the memory 360 and which may be the entire UE or a component of the UE, such as the TX processor 368, the RX processor 356, and/or the controller/processor 359). In FIG. 17, blocks indicated with dashed lines represent optional blocks.

At 1702, the UE receives a reference signal (e.g., reference signal 1202) at a plurality of antenna panels (e.g., antenna panel_1 602, antenna panel_2 604), wherein the reference signal is received in different beams (e.g., beams 606, 608, 610, 612) on each of the plurality of antenna panels. For example, with reference to FIGS. 6 and 12, the UE 502 may receive the reference signal 1202 in beams 606, 608 at antenna panel_1 602, and may receive the reference signal 1202 in beams 610, 612 at antenna panel_2 604. In some examples, the reference signal 1202 may be a CSI-RS. In some examples, the UE 502 may receive multiple transmissions of the reference signal 1202 in different beams at different times. In these examples, the UE 502 may receive a first transmission of the reference signal 1202 in the first beam 606 at antenna panel_1 602, a second transmission of the reference signal 1202 in the second beam 608 at antenna panel_1 602, a third transmission of the reference signal 1202 in the third beam 610 at antenna panel_2 604, and a fourth transmission of the reference signal 1202 in the fourth beam 612 at antenna panel_2 604.

At 1704, the UE determines, for each of the plurality of antenna panels, N beams providing highest measured strengths of the reference signal. In some examples, the UE 502 may measure a strength of a reference signal received in each beam on each antenna panel. In one example scenario, the UE may determine one beam (e.g., N=1) from the first and second beams 606, 608 providing the highest measured strength of the reference signal (e.g., reference signal 1202) on antenna panel_1 602, and one beam (e.g., N=1) from the third and fourth beams 610, 612 providing the highest measured strength of the reference signal (e.g., reference signal 1202) on antenna panel_2 604. In this example scenario, the UE may determine that a measured strength P1 of the reference signal in the second beam 608 is the highest measured strength of the reference signal on antenna panel_1 602, and may determine that a measured strength P2 of the reference signal in the third beam 610 is the highest measured strength of the reference signal on antenna panel_2 604.

At 1706, the UE determines a value of a maximum permissible exposure (MPE) indicator for each of the plurality of antenna panels, wherein the MPE indicator indicates whether an antenna panel is preferred or nonpreferred for uplink transmissions. In some examples, the value of the MPE indicator may be a single bit, wherein a first value of the single bit (e.g., '1') indicates that the antenna panel is preferred for the uplink transmissions and a second value of the single bit (e.g., '0') indicates that the antenna panel is nonpreferred for the uplink transmissions.

In some aspects of the disclosure, the UE determines the value of the MPE indicator for each of the plurality of antenna panels by identifying a first antenna panel, among the plurality of antenna panels, providing a highest measured strength of the reference signal after accounting for a transmission power back-off value. The UE sets a first MPE indicator for the first antenna panel to a first value to indicate that the first antenna panel is a preferred antenna panel for uplink transmissions. The UE sets at least a second MPE indicator for at least a second antenna panel of the plurality of antenna panels to a second value to indicate that the at least the second antenna panel is a nonpreferred antenna panel for uplink transmissions.

For example, the UE 502 may determine that the highest measured strength of the reference signal 1202 at antenna panel_1 602 is P1 and that the highest measured strength of the reference signal 1202 at antenna panel_2 604 is P2. The UE 502 may further determine an MPE transmission power back-off value (e.g., backoff_1) for antenna panel_1 602 and an MPE transmission power back-off value (e.g., backoff_2) for antenna panel_2 604. Therefore, the highest measured strength of the reference signal 1202 after accounting for a transmission power back-off value for antenna panel_1 602 may be expressed as P1−backoff_1, and the highest measured strength of the reference signal 1202 after accounting for a transmission power back-off value for antenna panel_2 604 may be expressed as P2−backoff_2.

In one example scenario, P1 may be greater than P2, and the result of the expression P2−backoff_2 may be greater than the result of the expression P1−backoff_1. In this example scenario, since the highest measured strength of the reference signal 1202 after accounting for a transmission power back-off value for antenna panel_2 604 (e.g., P2−backoff_2) is greater than the highest measured strength of the reference signal 1202 after accounting for a transmission power back-off value for antenna panel_1 602 (e.g., P1−backoff_1), the UE may determine that antenna panel_2 604 is preferred for uplink transmissions. In this example, the UE may set the value of the MPE indicator (also referred to as an MPE indicator value) for antenna panel_2 604 to '1' and may set the value of the MPE indicator for antenna panel_1 602 to '0'.

At 1708, the UE generates a beam management report (e.g., beam management report 1210) including at least the highest measured strengths of the N beams for each of the plurality of antenna panels and the value of the MPE indicator for each of the plurality of antenna panels. An example beam management report 1210 is shown in FIG. 13. As shown in FIG. 13, the beam management report 1210 may include the highest measured strength of the reference signal 1202 (e.g., P1) and a value of the MPE indicator (e.g., '0') for antenna panel_1 602, and the highest measured strength of the reference signal 1202 (e.g., P2) and a value of the MPE indicator (e.g., '1') for antenna panel_2 604. The UE 502 may transmit the beam management report 1210 to the base station 504.

At 1710, the UE transmits a beam management report. For example, the UE may transmit the beam management report 1210 shown in FIG. 13.

At 1712, the UE receives an antenna panel and beam selection from a base station for the uplink transmissions based on the beam management report. For example, with reference to FIG. 12, the base station 504 at 1212 may select an antenna panel and beam to be used for uplink transmissions at the UE 502 based on the beam management report 1210 and may transmit the antenna panel and beam selection 1214 to the UE 502. The UE 502 may receive the antenna panel and beam selection 1214. For example, the UE 502 may transmit the SRS 1216 using the antenna panel and beam selected by the base station 504 (e.g., the antenna panel_2 604 and the beam providing the highest measured strength after MPE transmission power back-off).

Figure 18:
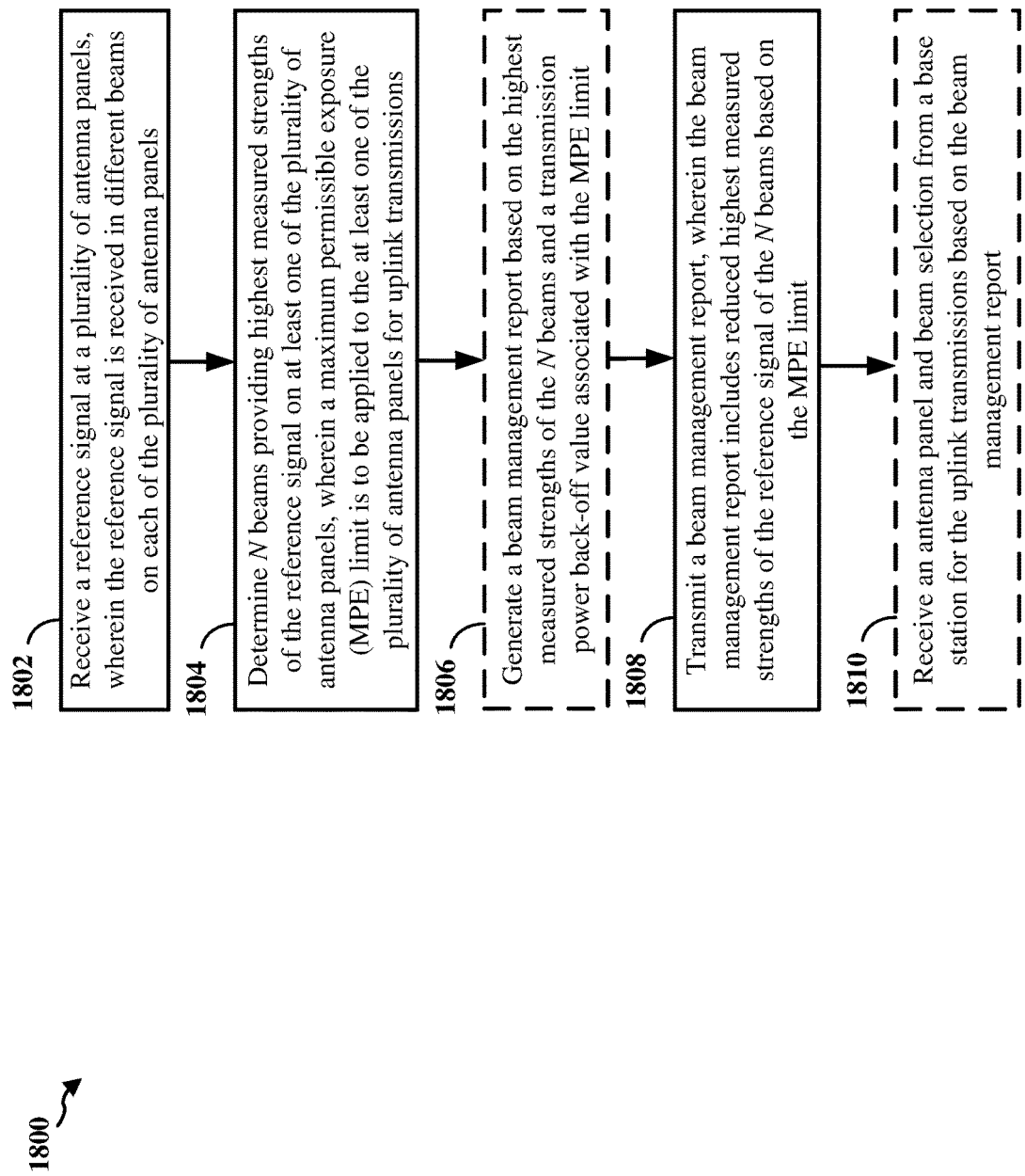
FIG. 18 is a flowchart of a method of wireless communication in accordance with various aspects of the disclosure.

FIG. 18 is a flowchart 1800 of a method of wireless communication. The method may be performed by a UE (e.g., the UE 104, 502; the apparatus 2102/2102'; the processing system 2214, which may include the memory 360 and which may be the entire UE or a component of the UE, such as the TX processor 368, the RX processor 356, and/or the controller/processor 359). In FIG. 18, blocks indicated with dashed lines represent optional blocks.

At 1802, the UE receives a reference signal at a plurality of antenna panels, wherein the reference signal is received in different beams on each of the plurality of antenna panels. For example, with reference to FIGS. 6 and 8, the UE 502 may receive the reference signal 802 in beams 606, 608 at antenna panel_1 602, and may receive the reference signal 802 in beams 610, 612 at antenna panel_2 604. In some examples, the reference signal 802 may be a CSI-RS. In some examples, the UE 502 may receive multiple transmissions of the reference signal 802 in different beams at different times. In these examples, the UE 502 may receive a first transmission of the reference signal 802 in the first beam 606 at antenna panel_1 602, a second transmission of the reference signal 802 in the second beam 608 at antenna panel_1 602, a third transmission of the reference signal 802 in the third beam 610 at antenna panel_2 604, and a fourth transmission of the reference signal 802 in the fourth beam 612 at antenna panel_2 604.

At 1804, the UE determines N beams providing highest measured strengths of the reference signal on at least one of the plurality of antenna panels, wherein a maximum permissible exposure (MPE) limit is to be applied to the at least one of the plurality of antenna panels for uplink transmissions. The UE may determine the N beams from among a plurality of beams on the at least one of the plurality of antenna panels.

For example, with reference to FIG. 6, the UE 502 may measure a strength of a reference signal received in each beam on each antenna panel. In one example scenario, the UE may determine one beam (e.g., N=1) from the first and second beams 606, 608 providing the highest measured strength of the reference signal on antenna panel_1 602, and one beam (e.g., N=1) from the third and fourth beams 610, 612 providing the highest measured strength of the reference signal on antenna panel_2 604. In this example scenario, the UE may determine that a measured strength P1 of the reference signal in the second beam 608 is the highest measured strength of the reference signal on antenna panel_1 602, and may determine that a measured strength P2 of the reference signal in the third beam 610 is the highest measured strength of the reference signal on antenna panel_2 604.

In some aspects of the disclosure, the UE may determine that the MPE limit is to be applied to the at least one of the plurality of antenna panels based on a control signal from a proximity sensor (e.g., one or more detectors using radar type technologies) configured to detect a proximate human contact to the UE.

At 1806, the UE generates a beam management report (e.g., beam management report 810 shown in FIGS. 8 and 9)

based on the highest measured strengths of the N beams and a transmission power back-off value associated with the MPE limit. In some aspects of the disclosure, the UE generates the beam management report by obtaining the highest measured strengths of the reference signal in the N beams and reducing the highest measured strengths by the transmission power back-off value to obtain reduced highest measured strengths. The reduced highest measured strengths of the reference signal in the N beams may account for the MPE limit. For example, the transmission power back-off value may be expressed in decibels per milliwatt (dBm) (e.g., 3 dBm or 6 dBm).

In the example scenario above, the UE may reduce the highest measured strength P1 of the reference signal in the second beam 608 on antenna panel_1 602 by the first MPE transmission power back-off value (e.g., P1−backoff_1), and may reduce the highest measured strength P2 of the reference signal in the third beam 610 on antenna panel_2 604 by the second MPE transmission power back-off value (e.g., P2−backoff_2). Accordingly, the beam management report may include the result of the expression P1−backoff_1, which represents the reduced highest measured strength for antenna panel_1 602, and may include the result of the expression P2−backoff_2, which represents the reduced highest measured strength for antenna panel_2 604.

At 1808, the UE transmits the beam management report, wherein the beam management report includes reduced highest measured strengths of the reference signal of the N beams based on the MPE limit. For example, as previously described, the beam management report may include the result of the expression P1−backoff_1, which represents the reduced highest measured strength for antenna panel_1 602, and may include the result of the expression P2−backoff_2, which represents the reduced highest measured strength for antenna panel_2 604. In some examples, the beam management report may include one or more fields for indicating the at least one of the plurality of antenna panels and one or more fields for indicating the reduced highest measured strengths of the N beams.

At 1810, the UE receives an antenna panel and beam selection from a base station for the uplink transmissions based on the beam management report. For example, with reference to FIG. 8, the base station 504 at 812 may select an antenna panel and beam to be used for uplink transmissions at the UE 502 based on the beam management report 810. The UE may receive the antenna panel and beam selection 814 from the base station 504.

Figure 19:
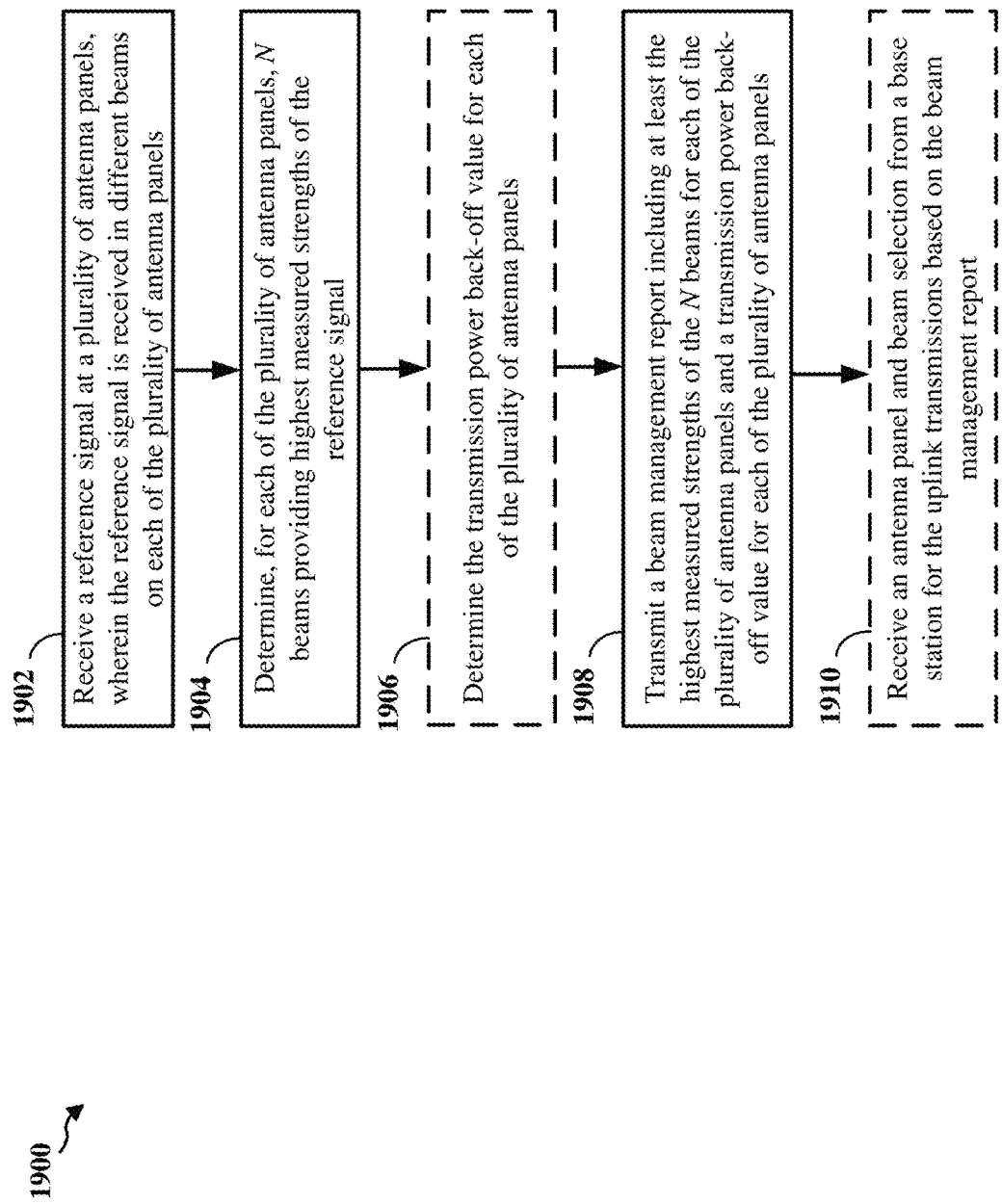
FIG. 19 is a flowchart of a method of wireless communication in accordance with various aspects of the disclosure.

FIG. 19 is a flowchart 1900 of a method of wireless communication. The method may be performed by a UE (e.g., the UE 104, 502; the apparatus 2102/2102'; the processing system 2214, which may include the memory 360 and which may be the entire UE or a component of the UE, such as the TX processor 368, the RX processor 356, and/or the controller/processor 359). In FIG. 19, blocks indicated with dashed lines represent optional blocks.

At 1902, the UE receives a reference signal at a plurality of antenna panels, wherein the reference signal is received in different beams on each of the plurality of antenna panels. For example, with reference to FIGS. 6 and 10, the UE 502 may receive the reference signal 1002 in beams 606, 608 at antenna panel_1 602, and may receive the reference signal 1002 in beams 610, 612 at antenna panel_2 604. In some examples, the reference signal 1002 may be a CSI-RS. In some examples, the UE 502 may receive multiple transmissions of the reference signal 1002 in different beams at different times. In these examples, the UE 502 may receive a first transmission of the reference signal 1002 in the first beam 606 at antenna panel_1 602, a second transmission of the reference signal 1002 in the second beam 608 at antenna panel_1 602, a third transmission of the reference signal 1002 in the third beam 610 at antenna panel_2 604, and a fourth transmission of the reference signal 1002 in the fourth beam 612 at antenna panel_2 604.

At 1904, the UE determines, for each of the plurality of antenna panels, N beams providing highest measured strengths of the reference signal. In some examples, the UE 502 may measure a strength of a reference signal received in each beam on each antenna panel. In one example scenario, the UE may determine one beam (e.g., N=1) from the first and second beams 606, 608 providing the highest measured strength of the reference signal (e.g., reference signal 1002) on antenna panel_1 602, and one beam (e.g., N=1) from the third and fourth beams 610, 612 providing the highest measured strength of the reference signal (e.g., reference signal 1002) on antenna panel_2 604. In this example scenario, the UE may determine that a measured strength P1 of the reference signal in the second beam 608 is the highest measured strength of the reference signal on antenna panel_1 602, and may determine that a measured strength P2 of the reference signal in the third beam 610 is the highest measured strength of the reference signal on antenna panel_2 604.

At 1906, the UE determines a transmission power back-off value for each of the plurality of antenna panels. In some examples, the UE may receive one or more transmission power back-off values from the base station (e.g., base station 504). For example, the transmission power back-off value may be expressed in decibels per milliwatt (dBm) (e.g., 3 dBm or 6 dBm). In some implementations, the UE may receive a set of transmission power back-off values from the base station 504, where each transmission power back-off value corresponds to a proximity of human contact.

For example, the set of MPE transmission power back-off values may enable the UE 502 to apply larger MPE transmission power back-off values as the human contact (e.g., a finger or face of a user) gets closer to an antenna panel. In some aspects of the disclosure, the transmission power back-off value is set to zero for any of the plurality of antenna panels excluded from a maximum permissible exposure (MPE) limit. For example, a transmission power back-off value for antenna panel_1 602 may be backoff_1 and a transmission power back-off value for antenna panel_2 604 may be backoff_2. In some examples, the transmission power back-off value is set to zero for any of the plurality of antenna panels excluded from a maximum permissible exposure (MPE) limit.

At 1908, the UE transmits a beam management report including at least the highest measured strengths of the N beams for each of the plurality of antenna panels and a transmission power back-off value for each of the plurality of antenna panels. For example, as shown in FIG. 11, the beam management report 1010 includes P1 and backoff_1 for antenna panel_1 602, where P1 represents the highest measured strength of the reference signal on antenna panel_1 602 and backoff_1 represents the transmission power back-off value for antenna panel_1 602. The beam management report 1010 further includes P2 and backoff_2 for antenna panel_2 604, where P2 represents the highest measured strength of the reference signal on antenna panel_2 604 and backoff_2 represents the transmission power back-off value for antenna panel_2 604.

For example, the beam management report may include one or more fields for indicating each of the plurality of antenna panels, one or more fields for indicating the highest measured strengths of the N beams for each of the plurality of antenna panels, and one or more fields for indicating the transmission power back-off value for each of the plurality of antenna panels.

At 1910, the UE receives an antenna panel and beam selection from a base station for the uplink transmissions based on the beam management report. For example, with reference to FIG. 10, the base station 504 at 1012 may select an antenna panel and beam to be used for uplink transmissions at the UE 502 based on the beam management report 1010. The UE may receive the antenna panel and beam selection 1014 from the base station 504.

Figure 20:
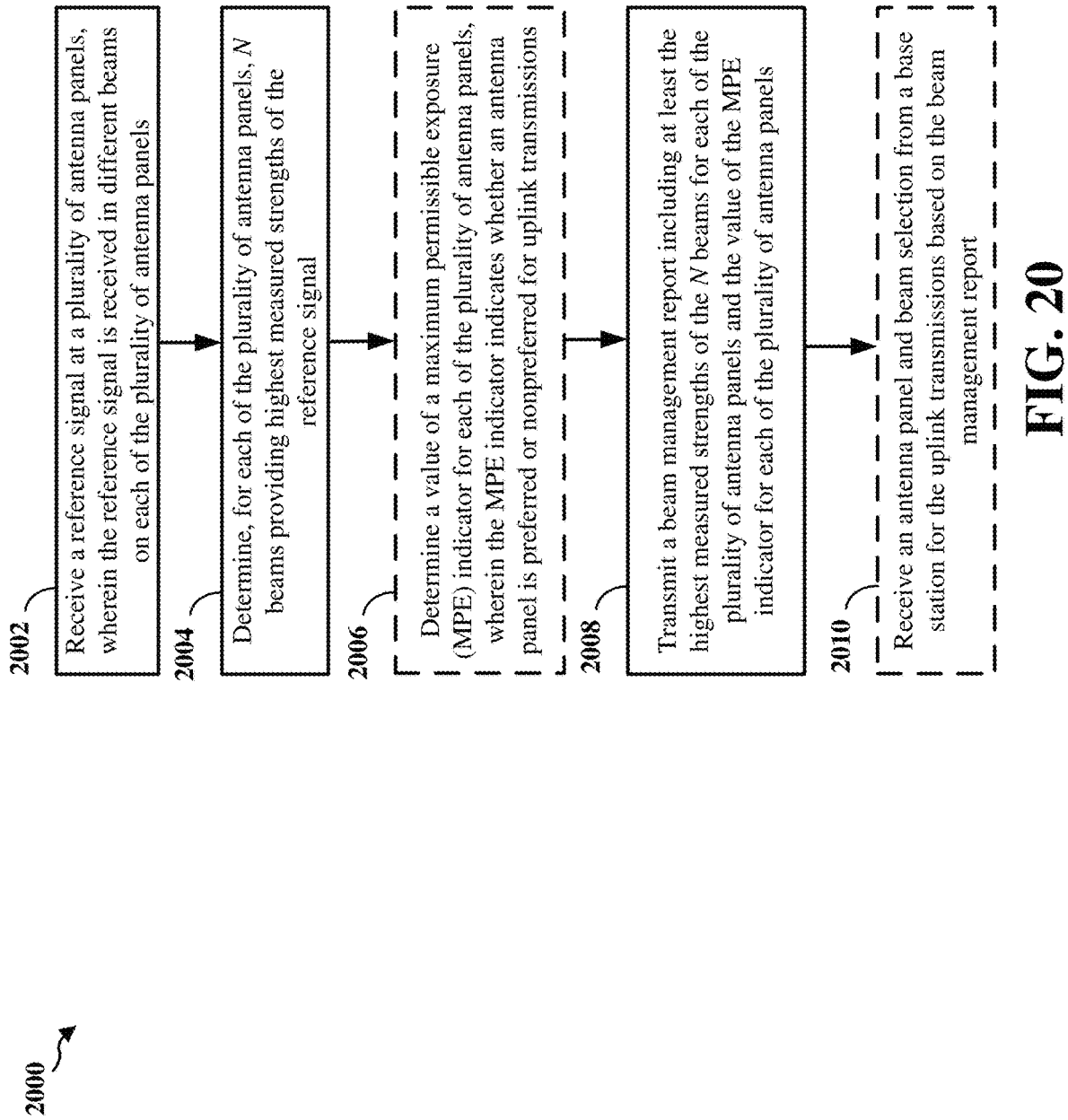
FIG. 20 is a flowchart of a method of wireless communication in accordance with various aspects of the disclosure.

FIG. 20 is a flowchart 2000 of a method of wireless communication. The method may be performed by a UE (e.g., the UE 104, 502; the apparatus 2102/2102'; the processing system 2214, which may include the memory 360 and which may be the entire UE or a component of the UE, such as the TX processor 368, the RX processor 356, and/or the controller/processor 359). In FIG. 20, blocks indicated with dashed lines represent optional blocks.

At 2002, the UE receives a reference signal at a plurality of antenna panels, wherein the reference signal is received in different beams on each of the plurality of antenna panels. For example, with reference to FIGS. 6 and 12, the UE 502 may receive the reference signal 1202 in beams 606, 608 at antenna panel_1 602, and may receive the reference signal 1202 in beams 610, 612 at antenna panel_2 604. In some examples, the reference signal 1202 may be a CSI-RS. In some examples, the UE 502 may receive multiple transmissions of the reference signal 1202 in different beams at different times. In these examples, the UE 502 may receive a first transmission of the reference signal 1202 in the first beam 606 at antenna panel_1 602, a second transmission of the reference signal 1202 in the second beam 608 at antenna panel_1 602, a third transmission of the reference signal 1202 in the third beam 610 at antenna panel_2 604, and a fourth transmission of the reference signal 1202 in the fourth beam 612 at antenna panel_2 604.

At 2004, the UE determines, for each of the plurality of antenna panels, N beams providing highest measured strengths of the reference signal. In some examples, the UE 502 may measure a strength of a reference signal received in each beam on each antenna panel. In one example scenario, the UE may determine one beam (e.g., N=1) from the first and second beams 606, 608 providing the highest measured strength of the reference signal (e.g., reference signal 1202) on antenna panel_1 602, and one beam (e.g., N=1) from the third and fourth beams 610, 612 providing the highest measured strength of the reference signal (e.g., reference signal 1202) on antenna panel_2 604. In this example scenario, the UE may determine that a measured strength P1 of the reference signal in the second beam 608 is the highest measured strength of the reference signal on antenna panel_1 602, and may determine that a measured strength P2 of the reference signal in the third beam 610 is the highest measured strength of the reference signal on antenna panel_2 604.

At 2006, the UE determines a value of a maximum permissible exposure (MPE) indicator for each of the plurality of antenna panels, wherein the MPE indicator indicates whether an antenna panel is preferred or nonpreferred for uplink transmissions. In some examples, the value of the MPE indicator is a single bit, wherein a first value of the single bit (e.g., '1') indicates that the antenna panel is preferred for the uplink transmissions and a second value of the single bit (e.g., '0') indicates that the antenna panel is nonpreferred for the uplink transmissions. In some aspects of the disclosure, the UE 502 may determine the value of the MPE indicator by identifying a first antenna panel, among the plurality of antenna panels, providing a highest measured strength of the reference signal after accounting for a transmission power back-off value, setting a first MPE indicator for the first antenna panel to a first value to indicate that the first antenna panel is a preferred antenna panel for uplink transmissions, and setting at least a second MPE indicator for at least a second antenna panel of the plurality of antenna panels to a second value to indicate that the at least the second antenna panel is a nonpreferred antenna panel for uplink transmissions.

For example, the UE 502 may determine that the highest measured strength of the reference signal 1202 at antenna panel_1 602 is P1 and that the highest measured strength of the reference signal 1202 at antenna panel_2 604 is P2. The UE 502 may further determine an MPE transmission power back-off value backoff_1 for antenna panel_1 602 and an MPE transmission power back-off value backoff_2 for antenna panel_2 604. Therefore, the highest measured strength of the reference signal 1202 after accounting for a transmission power back-off value for antenna panel_1 602 may be expressed as P1−backoff_1, and the highest measured strength of the reference signal 1202 after accounting for a transmission power back-off value for antenna panel_2 604 may be expressed as P2−backoff_2.

In one example scenario, P1 may be greater than P2, and the result of the expression P2−backoff_2 may be greater than the result of the expression P1−backoff_1. In this example scenario, since the highest measured strength of the reference signal 1202 after accounting for a transmission power back-off value for antenna panel_2 604 (e.g., P2−backoff_2) is greater than the highest measured strength of the reference signal 1202 after accounting for a transmission power back-off value for antenna panel_1 602 (e.g., P1−backoff_1), the UE may determine that antenna panel_2 604 is preferred for uplink transmissions. In this example, the UE may set a value of the MPE indicator for antenna panel_2 604 to '1' and may set a value of the MPE indicator for antenna panel_1 602 to '0'.

At 2008, the UE transmits a beam management report including at least the highest measured strengths of the N beams for each of the plurality of antenna panels and a value of the MPE indicator for each of the plurality of antenna panels. In some aspects of the disclosure, the beam management report includes one or more fields for indicating each of the plurality of antenna panels, one or more fields for indicating the highest measured strengths of the N beams for each of the plurality of antenna panels, and one or more fields for indicating the value of the MPE indicator for each of the plurality of antenna panels.

An example beam management report 1210 is shown in FIG. 13. As shown in FIG. 13, the beam management report 1210 may include the highest measured strength of the reference signal 1202 (e.g., P1) and a value of the MPE indicator (e.g., '0') for antenna panel_1 602, and the highest measured strength of the reference signal 1202 (e.g., P2) and a value of the MPE indicator (e.g., '1') for antenna panel_2 604. The UE 502 may transmit the beam management report 1210 to the base station 504.

At 2010, the UE receives an antenna panel and beam selection from a base station for the uplink transmissions based on the beam management report. For example, with reference to FIG. 12, the base station 504 at 1212 may select an antenna panel and beam to be used for uplink transmissions at the UE 502 based on the beam management report 1210 and may transmit the antenna panel and beam selection 1214 to the UE 502. The UE 502 may receive the antenna panel and beam selection 1214. For example, the UE 502 may transmit the SRS 1216 using the antenna panel and beam selected by the base station 504 (e.g., the antenna panel_2 604 and the beam providing the highest measured strength after MPE transmission power back-off).

Figure 21:
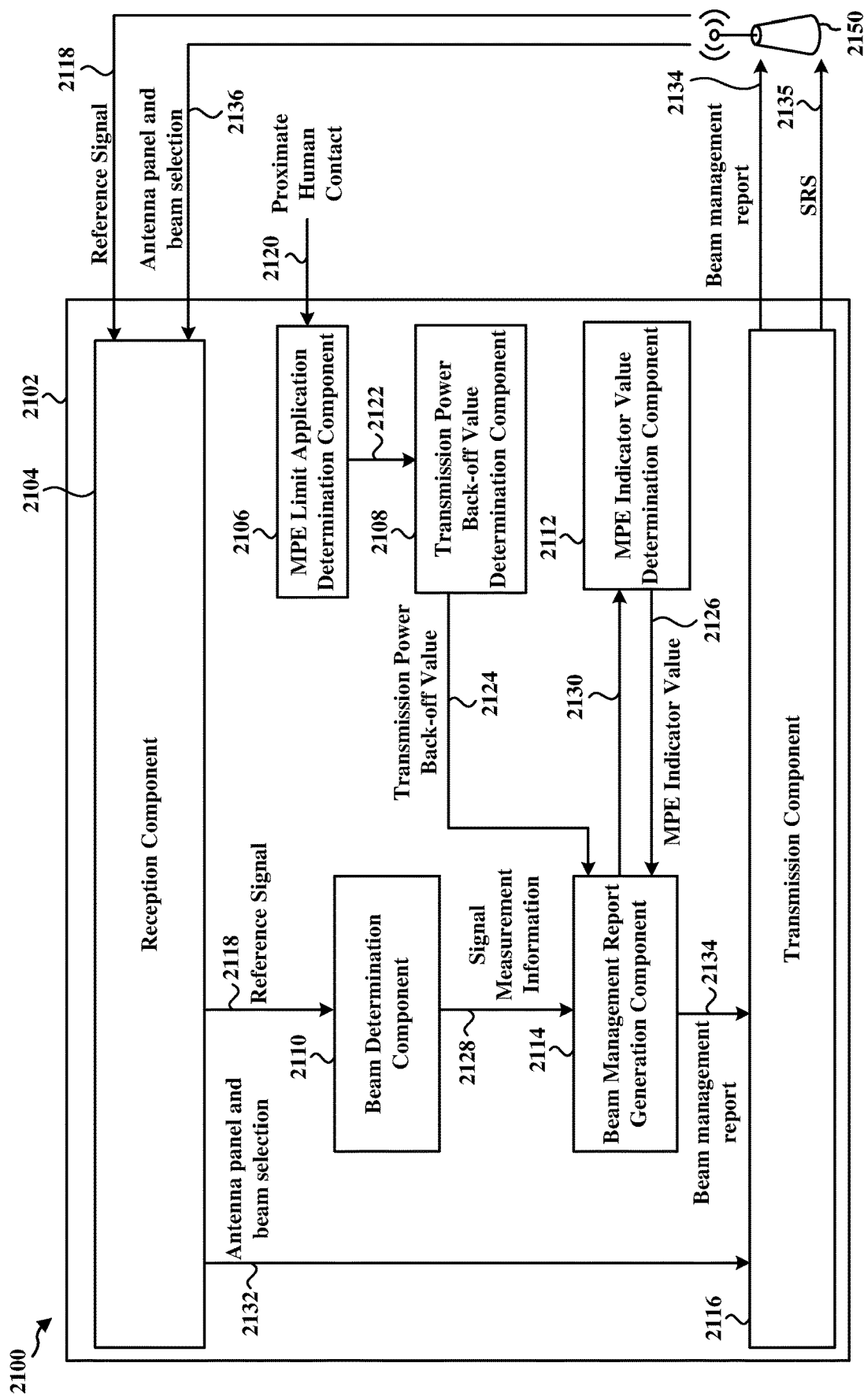
FIG. 21 is a conceptual data flow diagram illustrating the data flow between different means/components in an example apparatus in accordance with various aspects of the disclosure.

FIG. 21 is a conceptual data flow diagram 2100 illustrating the data flow between different means/components in an example apparatus 2102. The apparatus may be a UE. The apparatus includes a reception component 2104 that receives a reference signal 2118 at a plurality of antenna panels from a base station 2150. In some examples, the reception component 2104 may receive the reference signal 2118 in different beams on each of the plurality of antenna panels from the base station 2150. In some aspects of the disclosure, the reception component 2104 receives an antenna panel and beam selection 2136 from the base station 2150 based on a beam management report (e.g., beam management report 2134). In some examples, the reception component 2104 receives an antenna panel and beam selection 2136 from the base station 2150 for uplink transmissions based on the beam management report.

The apparatus further includes a maximum permissible exposure (MPE) limit application determination component 2106 that determines whether an MPE limit is to be applied to at least one of the plurality of antenna panels for uplink transmissions. In some implementations, the MPE limit application determination component 2106 may include one or more proximity sensors configured to detect a proximate human contact 2120 near one or more of the antenna panels of the apparatus 2102. For example, the MPE limit application determination component 2106 may determine that an MPE limit is to be applied to at least one of the plurality of antenna panels for uplink transmissions upon detection of the proximate human contact 2120 and may transmit a control signal 2122 indicating that the MPE limit is to be applied.

The apparatus further includes a transmission power back-off value determination component 2108 that determines a transmission power back-off value 2124 for each of the plurality of antenna panels. In some examples, the transmission power back-off value determination component 2108 determines the transmission power back-off value 2124 in response to receiving the control signal 2122.

The apparatus further includes a beam determination component 2110 that determines N beams, from among a plurality of beams on the at least one of the plurality of antenna panels, providing highest measured strengths of the reference signal, and/or determines, for each of the plurality of antenna panels, N beams providing highest measured strengths of the reference signal. The beam determination component 2110 may provide signal measurement information 2128 including the highest measured strengths of the reference signal 2118 received in beams on one or more of the antenna panels of the apparatus.

The apparatus further includes a maximum permissible exposure (MPE) indicator value determination component 2112 that determines a value of an MPE indicator for each of the plurality of antenna panels, where the MPE indicator indicates whether an antenna panel is preferred or nonpreferred for uplink transmissions. For example, the MPE indicator may indicate whether an antenna panel is preferred or nonpreferred for uplink transmissions using a single bit. In some aspects of the disclosure, the MPE indicator value determination component 2112 is configured to receive highest measured strengths 2130 of the reference signal 2118 on the plurality of antenna panels which have been reduced by the transmission power back-off value 2124 to account for the MPE limit. In these aspects of the disclosure, the MPE indicator value determination component 2112 may identify a first antenna panel, among the plurality of antenna panels, providing a highest measured strength of the reference signal after accounting for a transmission power back-off value, set a first MPE indicator for the first antenna panel to a first value to indicate that the first antenna panel is a preferred antenna panel for uplink transmissions, and set at least a second MPE indicator for at least a second antenna panel of the plurality of antenna panels to a second value to indicate that the at least the second antenna panel is a nonpreferred antenna panel for uplink transmissions.

The apparatus further includes a beam management report generation component 2114 that generates a beam management report 2134. In some examples, the beam management report generation component 2114 generates the beam management report based on the highest measured strengths of the N beams and a transmission power back-off value associated with the MPE limit. In some aspects of the disclosure, the beam management report generation component 2114 generates the beam management report by obtaining the highest measured strengths of the reference signal in the N beams and reducing the highest measured strengths by the transmission power back-off value to obtain the reduced highest measured strengths.

In some aspects of the disclosure, the beam management report generation component 2114 generates a beam management report 2134 including at least the highest measured strengths of the N beams after accounting for the MPE limit, including at least the highest measured strengths of the N beams for each of the plurality of antenna panels and the transmission power back-off value for each of the plurality of antenna panels, and/or including at least the highest measured strengths of the N beams for each of the plurality of antenna panels and a value of the MPE indicator for each of the plurality of antenna panels. In some examples, the highest measured strengths of the N beams after accounting for the MPE limit may also be referred to as reduced highest measured strengths of the reference signal in the N beams.

The apparatus further includes a transmission component 2116 that transmits the beam management report 2134 and/or uplink data to the base station 2150. In some aspects of the disclosure, the transmission component 2116 transmits a beam management report, wherein the beam management report includes reduced highest measured strengths of the reference signal of the N beams based on the MPE limit. In some aspects of the disclosure, the transmission component 2116 transmits a beam management report including at least the highest measured strengths of the N beams for each of the plurality of antenna panels and a transmission power back-off value for each of the plurality of antenna panels. In some aspects of the disclosure, the transmission component 2116 transmits beam management report including at least the highest measured strengths of the N beams for each of the plurality of antenna panels and a value of the MPE indicator for each of the plurality of antenna panels. In some aspects of the disclosure, the transmission component 2116 transmits an SRS 2135 using an antenna panel and beam indicated in the antenna panel and beam selection 2136 from the base station 2150.

The apparatus may include additional components that perform each of the blocks of the algorithm in the aforementioned flowcharts of FIGS. 15-20. As such, each block in the aforementioned flowcharts of FIGS. 15-20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
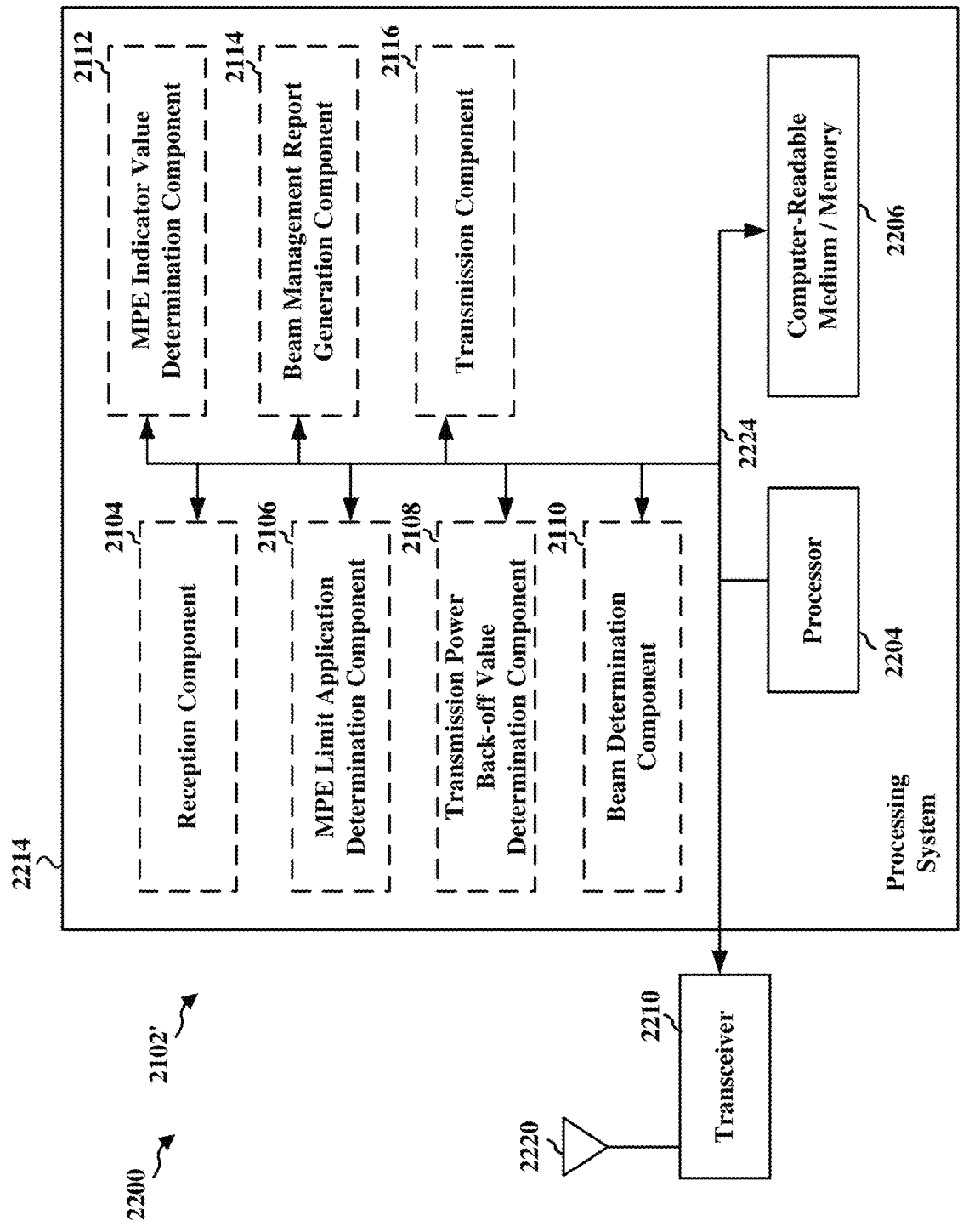
FIG. 22 is a diagram illustrating an example of a hardware implementation for an apparatus employing a processing system in accordance with various aspects of the disclosure.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, 2112, 2114, 2116, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2116, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108, 2110, 2112, 2114, 2116. The components may be software components running in the processor 2204, resident/stored in the computer readable medium/memory 2206, one or more hardware components coupled to the processor 2204, or some combination thereof. The processing system 2214 may be a component of the UE 350 and may include the memory 360 and/or at least one of the TX processor 368, the RX processor 356, and the controller/processor 359. Alternatively, the processing system 2214 may be the entire UE (e.g., see 350 of FIG. 3).

In one configuration, the apparatus 2102/2102' for wireless communication includes means for receiving a reference signal at a plurality of antenna panels, wherein the reference signal is received in different beams on each of the plurality of antenna panels, means for determining, for each of the plurality of antenna panels, N beams providing highest measured strengths of the reference signal, means for determining N beams providing highest measured strengths of the reference signal on at least one of the plurality of antenna panels, wherein a maximum permissible exposure (MPE) limit is to be applied to the at least one of the plurality of antenna panels for uplink transmissions, means for determining a transmission power back-off value for each of the plurality of antenna panels, means for generating a beam management report including at least the highest measured strengths of the N beams after accounting for the MPE limit, means for generating the beam management report based on the highest measured strengths of the N beams and a transmission power back-off value associated with the MPE limit, means for generating a beam management report including at least the highest measured strengths of the N beams for each of the plurality of antenna panels and the transmission power back-off value for each of the plurality of antenna panels, means for determining a value of a maximum permissible exposure (MPE) indicator for each of the plurality of antenna panels, wherein the MPE indicator indicates whether an antenna panel is preferred or nonpreferred for uplink transmissions, means for generating a beam management report including at least the highest measured strengths of the N beams for each of the plurality of antenna panels and the value of the MPE indicator for each of the plurality of antenna panels, and means for transmitting the beam management report.

The means for transmitting the beam management report may be configured to transmit a beam management report including reduced highest measured strengths of the reference signal of the N beams based on the MPE limit, a beam management report including at least the highest measured strengths of the N beams for each of the plurality of antenna panels and a transmission power back-off value for each of the plurality of antenna panels, and/or a beam management report including at least the highest measured strengths of the N beams for each of the plurality of antenna panels and a maximum permissible exposure (MPE) indicator value for each of the plurality of antenna panels.

The apparatus 2102/2102' for wireless communication further includes means for receiving an antenna panel and beam selection from a base station for uplink transmissions based on the beam management report. In some aspects, the antenna panel and beam selection indicates a beam of the N beams on the at least one of the plurality of antenna panels, where the indicated beam provides a highest received power at the base station for uplink transmissions relative to other beams of the N beams when the UE applies the MPE limit. In some aspects, the antenna panel and beam selection indicates a beam of the N beams on one of the plurality of antenna panels, where the indicated beam provides a highest received power at the base station for uplink transmissions relative to all other beams on all other antenna panels when the UE applies the transmission power back-off value. In some aspects, the antenna panel and beam selection indicates a beam of the N beams on one of the plurality of antenna panels, where the indicated beam provides a highest received power at the base station for uplink transmissions relative to all other beams on all other antenna panels when the UE applies the transmission power back-off value.

The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The aspects described herein may enable a UE to transmit uplink transmissions using the best beam on the best antenna panel of the UE. For example, the UE may transmit a beam management report to a base station, where one or more of the measured strengths of a reference signal included in the beam management report with respect to an antenna panel subject to an MPE limit may account for the MPE limit. In another example, the UE may transmit a beam management report to a base station, where the beam management report may include one or more measured strengths of a reference signal included with respect to an antenna panel subject to an MPE limit and a transmission power back-off value for the antenna panel subject to the MPE limit. In another example, the UE may transmit a beam management report to a base station, where the beam management report may include one or more measured strengths of a reference signal with respect to an antenna panel subject to an MPE limit and a value of an MPE indicator for the antenna panel subject to an MPE limit. The MPE indicator may indicate whether an antenna panel is preferred or nonpreferred for uplink transmissions.

In these examples, at least some of the measured strengths of a reference signal included in the beam management report either take into account the MPE limit or indicate information associated with the MPE limit (e.g., the transmission power back-off value for an antenna panel subject to the MPE limit or value of the MPE indicator indicating whether an antenna panel is preferred or nonpreferred for uplink transmissions). As a result, the base station may be able to select the best beam and antenna panel combination for uplink transmissions when relying on the measured strengths of a reference signal in the beam management report.

The following provides an overview of aspects of the present disclosure:

Aspect 1: A method of wireless communication for a user equipment (UE), comprising: receiving a reference signal at a plurality of antenna panels, wherein the reference signal is received in different beams on each of the plurality of antenna panels; determining N beams providing highest measured strengths of the reference signal on at least one of the plurality of antenna panels, wherein a maximum permissible exposure (MPE) limit is to be applied to the at least one of the plurality of antenna panels for uplink transmissions; and transmitting a beam management report, wherein the beam management report includes reduced highest measured strengths of the reference signal of the N beams based on the MPE limit.

Aspect 2: The method of aspect 1, further comprising: generating the beam management report based on the highest measured strengths of the N beams and a transmission power back-off value associated with the MPE limit.

Aspect 3: The method of aspect 1 or 2, wherein generating the beam management report comprises: obtaining the highest measured strengths of the reference signal in the N beams; and reducing the highest measured strengths by the transmission power back-off value to obtain the reduced highest measured strengths.

Aspect 4: The method of any of aspects 1 through 3, further comprising: receiving an antenna panel and beam selection from a base station for the uplink transmissions based on the beam management report.

Aspect 5: The method of any of aspects 1 through 4, wherein the beam management report includes one or more fields for indicating the at least one of the plurality of antenna panels and one or more fields for indicating the reduced highest measured strengths of the N beams.

Aspect 6: An apparatus for wireless communication, comprising: a memory; and at least one processor coupled to the memory and configured to perform a method of any one of aspects 1 through 5.

Aspect 7: An apparatus for wireless communication comprising at least one means for performing a method of any one of aspects 1 through 5.

Aspect 8: A computer-readable medium storing computer executable code, the code when executed by a processor cause the processor to perform a method of any one of aspects 1 through 5.

Aspect 9: A method of wireless communication for a user equipment (UE), comprising: receiving a reference signal at a plurality of antenna panels, wherein the reference signal is received in different beams on each of the plurality of antenna panels; determining, for each of the plurality of antenna panels, N beams providing highest measured strengths of the reference signal; and transmitting a beam management report including at least the highest measured strengths of the N beams for each of the plurality of antenna panels and a transmission power back-off value for each of the plurality of antenna panels.

Aspect 10: The method of aspect 9, further comprising: determining the transmission power back-off value for each of the plurality of antenna panels.

Aspect 11: The method of aspect 9 or 10, further comprising: receiving an antenna panel and beam selection from a base station for the uplink transmissions based on the beam management report.

Aspect 12: The method of any of aspects 9 through 11, wherein the transmission power back-off value is set to zero for any of the plurality of antenna panels excluded from a maximum permissible exposure (MPE) limit.

Aspect 13: The method of any of aspects 9 through 12, wherein the beam management report includes one or more fields for indicating each of the plurality of antenna panels, one or more fields for indicating the highest measured strengths of the N beams for each of the plurality of antenna panels, and one or more fields for indicating the transmission power back-off value for each of the plurality of antenna panels.

Aspect 14: The method of any of aspects 9 through 13, wherein the reference signal is a channel state information reference signal (CSI-RS).

Aspect 15: An apparatus for wireless communication, comprising: a memory;
and at least one processor coupled to the memory and configured to perform a method of any one of aspects 9 through 14.

Aspect 16: An apparatus for wireless communication comprising at least one means for performing a method of any one of aspects 9 through 14.

Aspect 17: A computer-readable medium storing computer executable code, the code when executed by a processor cause the processor to perform a method of any one of aspects 9 through 14.

Aspect 18: A method of wireless communication for a user equipment (UE), comprising: receiving a reference signal at a plurality of antenna panels, wherein the reference signal is received in different beams on each of the plurality of antenna panels; determining, for each of the plurality of antenna panels, N beams providing highest measured strengths of the reference signal; and transmitting a beam management report including at least the highest measured strengths of the N beams for each of the plurality of antenna panels and a value of a maximum permissible exposure (MPE) indicator for each of the plurality of antenna panels.

Aspect 19: The method of aspect 18, further comprising: determining the value of the MPE indicator for each of the plurality of antenna panels, wherein the MPE indicator indicates whether an antenna panel is preferred or nonpreferred for uplink transmissions.

Aspect 20: The method of aspect 19, wherein determining the value of the MPE indicator for each of the plurality of antenna panels comprises: identifying a first antenna panel, among the plurality of antenna panels, providing a highest measured strength of the reference signal after accounting for a transmission power back-off value; setting a first MPE indicator for the first antenna panel to a first value to indicate that the first antenna panel is a preferred antenna panel for uplink transmissions; and setting at least a second MPE indicator for at least a second antenna panel of the plurality of antenna panels to a second value to indicate that the at least the second antenna panel is a nonpreferred antenna panel for uplink transmissions.

Aspect 21: The method of any of aspects 18 through 20, further comprising: receiving an antenna panel and beam selection from a base station for the uplink transmissions based on the beam management report.

Aspect 22: The method of any of aspects 18 through 21, wherein the value of the MPE indicator includes a single bit, wherein a first value of the single bit indicates that the antenna panel is preferred for the uplink transmissions and a second value of the single bit indicates that the antenna panel is nonpreferred for the uplink transmissions.

Aspect 23: The method of any of aspects 18 through 22, wherein the reference signal is a channel state information reference signal (CSI-RS).

Aspect 24: The method of any of aspects 18 through 23, wherein the beam management report includes one or more fields for indicating each of the plurality of antenna panels, one or more fields for indicating the highest measured strengths of the N beams for each of the plurality of antenna panels, and one or more fields for indicating the value of the MPE indicator for each of the plurality of antenna panels.

Aspect 25: An apparatus for wireless communication, comprising: a memory; and at least one processor coupled to the memory and configured to perform a method of any one of aspects 18 through 24.

Aspect 26: An apparatus for wireless communication comprising at least one means for performing a method of any one of aspects 18 through 24.

Aspect 27: A computer-readable medium storing computer executable code, the code when executed by a processor cause the processor to perform a method of any one of aspects 18 through 24.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
a memory; and
at least one processor coupled to the memory and configured to:
receive a reference signal at a plurality of antenna panels, wherein the reference signal is received in different beams on each of the plurality of antenna panels;
determine, for each of the plurality of antenna panels, N beams providing highest measured strengths of the reference signal, wherein N is a non-zero positive integer;
determine a value of a maximum permissible exposure (MPE) indicator for each of the plurality of antenna panels, wherein the MPE indicator indicates whether an antenna panel is preferred or nonpreferred for uplink transmissions; and
transmit a beam management report including at least the highest measured strengths of the N beams for each of the plurality of antenna panels and the value of the MPE indicator for each of the plurality of antenna panels, wherein the beam management report includes one or more fields for indicating a transmission power back-off value for each of the plurality of antenna panels.

2. The apparatus of claim 1, wherein the at least one processor configured to determine the value of the MPE indicator for each of the plurality of antenna panels is further configured to:
identify a first antenna panel, among the plurality of antenna panels, providing a highest measured strength of the reference signal after accounting for the transmission power back-off value;
set a first MPE indicator for the first antenna panel to a first value to indicate that the first antenna panel is a preferred antenna panel for uplink transmissions; and set at least a second MPE indicator for at least a second antenna panel of the plurality of antenna panels to a second value to indicate that the at least the second antenna panel is a nonpreferred antenna panel for uplink transmissions.

3. The apparatus of claim 1, wherein the at least one processor is further configured to:
receive an antenna panel and beam selection from a base station for the uplink transmissions based on the beam management report.

4. The apparatus of claim 1, wherein the value of the MPE indicator includes a single bit, wherein a first value of the single bit indicates that the antenna panel is preferred for the uplink transmissions and a second value of the single bit indicates that the antenna panel is nonpreferred for the uplink transmissions.

5. The apparatus of claim 1, wherein the reference signal is a channel state information reference signal (CSI-RS).

6. The apparatus of claim 1, wherein the beam management report further includes one or more fields for indicating each of the plurality of antenna panels, and one or more fields for indicating the highest measured strengths of the N beams for each of the plurality of antenna panels.

7. A method for wireless communication, comprising:
receiving a reference signal at a plurality of antenna panels, wherein the reference signal is received in different beams on each of the plurality of antenna panels;
determining, for each of the plurality of antenna panels, N beams providing highest measured strengths of the reference signal, wherein N is a non-zero positive integer;
determining a value of a maximum permissible exposure (MPE) indicator for each of the plurality of antenna panels, wherein the MPE indicator indicates whether an antenna panel is preferred or nonpreferred for uplink transmissions; and
transmitting a beam management report including at least the highest measured strengths of the N beams for each of the plurality of antenna panels and the value of the MPE indicator for each of the plurality of antenna panels, wherein the beam management report includes one or more fields for indicating a transmission power back-off value for each of the plurality of antenna panels.

8. The method of claim 7, wherein determining the value of the MPE indicator for each of the plurality of antenna panels comprises:
identifying a first antenna panel, among the plurality of antenna panels, providing a highest measured strength of the reference signal after accounting for the transmission power back-off value;
setting a first MPE indicator for the first antenna panel to a first value to indicate that the first antenna panel is a preferred antenna panel for uplink transmissions; and
setting at least a second MPE indicator for at least a second antenna panel of the plurality of antenna panels to a second value to indicate that the at least the second antenna panel is a nonpreferred antenna panel for uplink transmissions.

9. The method of claim 7, further comprising:
receiving an antenna panel and beam selection from a base station for the uplink transmissions based on the beam management report.

10. The method of claim 7, wherein the value of the MPE indicator includes a single bit, wherein a first value of the single bit indicates that the antenna panel is preferred for the uplink transmissions and a second value of the single bit indicates that the antenna panel is nonpreferred for the uplink transmissions.

11. The method of claim 7, wherein the reference signal is a channel state information reference signal (CSI-RS).

12. The method of claim 7, wherein the beam management report further includes one or more fields for indicating each of the plurality of antenna panels, and one or more fields for indicating the highest measured strengths of the N beams for each of the plurality of antenna panels.

* * * * *